US012682885B2

(12) United States Patent
Gupta et al.

(10) Patent No.: US 12,682,885 B2
(45) Date of Patent: Jul. 14, 2026

(54) AUDIO AND VIDEO TRANSLATOR

(71) Applicant: Deep Media Inc., Oakland, CA (US)

(72) Inventors: Rijul Gupta, Oakland, CA (US);
Emma Brown, Portland, OR (US)

(73) Assignee: Deep Media Inc., Oakland, CA (US)

( * ) Notice: Subject to any disclaimer, the term of this
patent is extended or adjusted under 35
U.S.C. 154(b) by 17 days.

(21) Appl. No.: 18/581,098

(22) Filed: Feb. 19, 2024

(65) Prior Publication Data

US 2024/0194183 A1     Jun. 13, 2024

Related U.S. Application Data

(63) Continuation of application No. 18/070,626, filed on
Nov. 29, 2022, now Pat. No. 11,908,449, which is a
continuation of application No. 17/737,546, filed on
May 5, 2022, now Pat. No. 11,551,664.

(60) Provisional application No. 63/184,746, filed on May
5, 2021.

(51) Int. Cl.
| | |
|---|---|
| *G10L 13/08* | (2013.01) |
| *G06F 40/103* | (2020.01) |
| *G06F 40/42* | (2020.01) |
| *G06T 7/20* | (2017.01) |
| *G10L 15/04* | (2013.01) |
| *G10L 17/00* | (2013.01) |

(52) U.S. Cl.
CPC ............ *G10L 13/08* (2013.01); *G06F 40/103*
(2020.01); *G06F 40/42* (2020.01); *G06T 7/20*
(2013.01); *G10L 15/04* (2013.01); *G10L 17/00*
(2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 10,846,522 | B2 * | 11/2020 | Chaudhuri | .............. G06N 3/08 |
| 2010/0030578 | A1 * | 2/2010 | Siddique | ................ G06Q 20/12 |
| | | | | 705/26.1 |
| 2012/0026174 | A1 * | 2/2012 | McKeon | ................. G06T 13/40 |
| | | | | 345/473 |
| 2013/0215116 | A1 * | 8/2013 | Siddique | ................ G06Q 20/40 |
| | | | | 705/26.7 |
| 2014/0114648 | A1 * | 4/2014 | Eggink | ................... G06F 40/30 |
| | | | | 704/9 |
| 2016/0379622 | A1 * | 12/2016 | Patel | ....................... G10L 13/06 |
| | | | | 704/260 |

(Continued)

*Primary Examiner* — Jakieda R Jackson
(74) *Attorney, Agent, or Firm* — Anton J. Hopen; Trenam
Law

(57) ABSTRACT

A system and method for translating audio, and video when
desired. The translations include synthetic media and data
generated using AI systems. Through unique processors and
generators executing a unique sequence of steps, the system
and method produces more accurate translations that can
account for various speech characteristics (e.g., emotion,
pacing, idioms, sarcasm, jokes, tone, phonemes, etc.). These
speech characteristics are identified in the input media and
synthetically incorporated into the translated outputs to
mirror the characteristics in the input media. Some embodi-
ments further include systems and methods that manipulate
the input video such that the speakers' faces and/or lips
appear as if they are natively speaking the generated audio.

19 Claims, 13 Drawing Sheets

(56) References Cited

U.S. PATENT DOCUMENTS

| | | | | |
|---|---|---|---|---|
| 2019/0244623 | A1* | 8/2019 | Hall | G06T 13/40 |
| 2019/0379791 | A1* | 12/2019 | Winter | H04M 3/5183 |
| 2020/0036659 | A1* | 1/2020 | Wu | G06F 40/30 |
| 2020/0160351 | A1* | 5/2020 | Veggalam | H04M 3/5233 |
| 2020/0349230 | A1* | 11/2020 | Yoshioka | G06F 40/58 |
| 2021/0165973 | A1* | 6/2021 | Kofman | G06F 40/30 |
| 2021/0216723 | A1* | 7/2021 | Zhang | G06F 18/214 |
| 2021/0224319 | A1* | 7/2021 | Ingel | G06F 16/686 |
| 2023/0298615 | A1* | 9/2023 | Can | G10L 15/1815 |

* cited by examiner

AUDIO AND VIDEO TRANSLATOR

CROSS-REFERENCE TO RELATED APPLICATIONS

This nonprovisional application is a continuation of and claims priority to nonprovisional application Ser. No. 18/070,626, entitled "AUDIO AND VIDEO TRANSLATOR," filed Nov. 29, 2022 by the same inventor(s), which is a continuation of and claims priority to nonprovisional application Ser. No. 17/737,546, now U.S. Pat. No. 11,551,664 entitled "AUDIO AND VIDEO TRANSLATOR," filed May 5, 2022 by the same inventor(s), which claims priority to provisional application No. 63/184,746, entitled "IMAGE TRANSLATOR," filed May 5, 2021 by the same inventor (s).

BACKGROUND OF THE INVENTION

1. Field of the Invention

This invention relates, generally, to video and audio manipulation. More specifically, it relates to audio translation and lip reanimation.

2. Brief Description of the Prior Art

Traditional audio translation techniques are extremely tedious and time consuming. Often times one or more individuals are required to listen, record, transcribe, and translate audio. Dubbing the translated audio over an existing video can be even more difficult and often requires significant human investment and intervention. Furthermore, the translated audio almost never synchronizes with the speaker's lip movement in a corresponding video.

Accordingly, what is needed is a system and method to more efficiently and effectively translate audio and reanimate a speaker's lip in a video. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved audio and video translator is now met by a new, useful, and nonobvious invention.

The present invention includes a system and method for translating speech within a media file. An embodiment of the method includes first acquiring an input media file. In some embodiments, the input media file is in a computer-readable format. The input media file includes input audio in a first input language and in some embodiments includes input video. The method further includes acquiring a first output language and the first output language is different from the first input language.

Some embodiments, further include preprocessing input audio to partition one vocal stream from another, reduce background noise, or enhance a quality of the vocal streams. Some embodiments also include preprocessing the input video to capture lip movement tracking data.

Once the inputs are acquired, the input audio is segmented into a plurality of vocal segments. Each vocal segment in the plurality of vocal segments includes a speaker identification to identify the speaker of each vocal segment. For each vocal segment in the plurality of vocal segments pacing information is identified for each word or phoneme in each vocal segment. In some embodiments, segmenting the input audio into a plurality of vocal segments and identifying timing information is performed by a speaker diarization processor configured to receive the input media file as an input.

The novel method further includes acquiring an input transcription. The input transcription includes text corresponding to the words spoken in each vocal segment. The text transcription may be formatted according to the international phonetics alphabet. In addition, the input transcription may further include sentiment analysis and tracking data corresponding to anatomical landmarks for the speaker for each vocal segment. In some embodiments, acquiring the input transcription of the input audio includes providing the input audio to an artificial intelligence (AI) generator configured to convert the input audio into text.

Then, input meta information is acquired. The meta information includes emotion data and tone data. Emotion data corresponds to one or more detectable emotions from a list of predetermined emotions. Tone data may likewise correspond to one or more detectable tones from a list of predetermined emotions or a spectrum of tones. In some embodiments, acquiring input meta information includes providing the input audio and the input transcription to an AI meta information processor configured to identify meta information.

Once the meta data is acquired, the input transcription and input meta information are translated into the first output language based at least on the timing information and the emotion data, such that the translated transcription and meta information include similar emotion and pacing in comparison to the input transcription and input meta information. In some embodiments, similar pacing includes less than or equal to 20% difference in hamming distance between phonetic characters and inclusion of pauses, breaths, and filler sounds in the proper locations. In some embodiments, translating the input transcription and input meta information includes providing the input transcription and input meta information to an AI transcription and meta translation generator configured to generate the translated transcription and meta information.

Finally, translated audio is generated using the translated input transcription and meta information. In some embodiments, generating translated audio includes providing the translated transcription and meta information to an AI audio translation generator configured to generate the translated audio.

Some embodiments of the method further include stitching the translated audio for each vocal segment back into a single audio file. Some embodiments further include providing the translated audio and the input video to a video sync generator and generating, by the video sync generator, a synced video in which the translated audio syncs with the input video.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
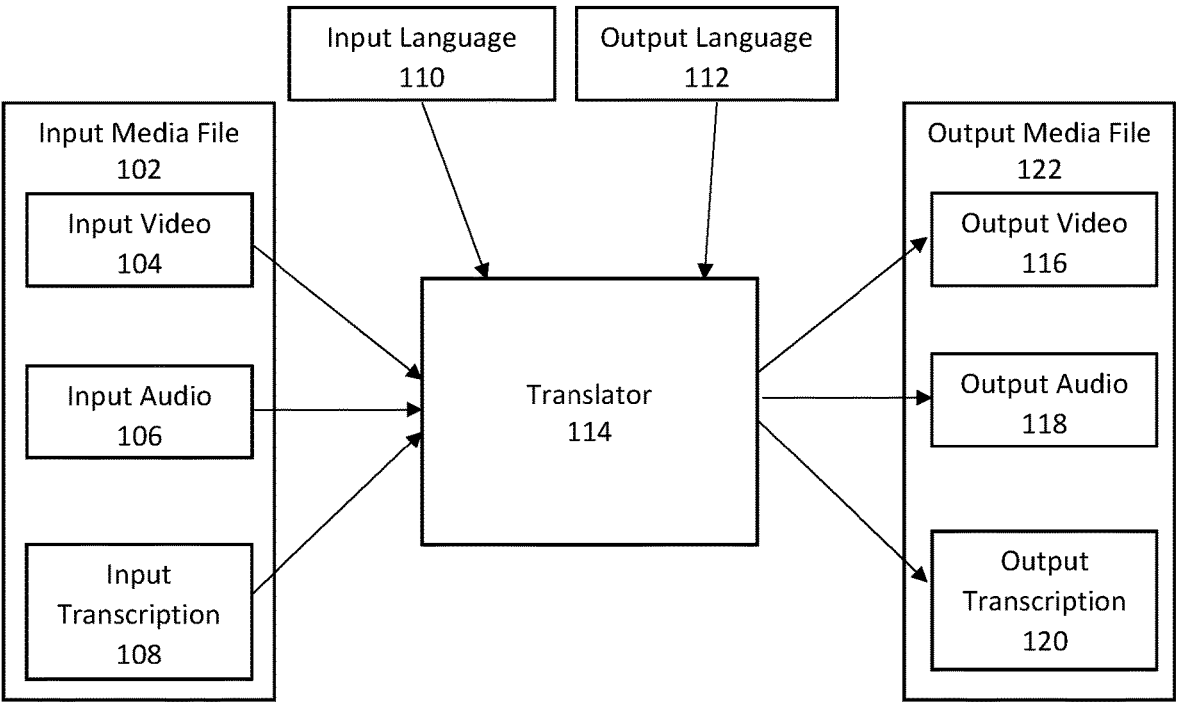
FIG. 1 is a block diagram of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Referring now to the specifics of the present invention, some embodiments, include one or more computer systems having a memory, a user interface with a visual display (also referred to as a "graphic user interface" or "GUI"), and a processor for executing a program performing at least the steps described herein. In some embodiments, the present invention is a computer executable method or is a method embodied in software for executing the steps described herein. Further explanation of the hardware and software can be found in the Hardware and software infrastructure examples section below.

A media file refers to a video file and/or audio file. These media files can have any file formats known to a person of ordinary skill in the art. The subject of a media file is an identifiable object, speaker, person, or animal from which the audio originates within the media file. There may be more than one subject in each media file.

An input media file is a media file provided to or acquired by the translator for translation. The output media file is a synthetic or manipulated version of the input media file in which the translation has occurred. The output media file depicts one or more subjects that appear to be speaking a different language than spoken in the input media file. In some embodiments, the output media file further at least a portion of the subjects' facial landmarks (e.g., the subjects' lips) moving in accordance with the new language.

Current translation efforts are based on text-to-text solutions, and thus fall short of being useful in communication that includes audio and/or video, including but not limited to phone calls, video calls, translating audiobooks, creating subtitles, generating native-appearing video, etc. The present invention creates and uses synthetic media (i.e., media created using generative AI, generative adversarial networks, DeepFake systems, and other systems and methods configured to manipulate media from its original form) to combine text, audio, and video information during training and inference (inference is a term of art referring to using the AI-based systems to create an output, which in this case is synthetic media) to enable an end-to-end translation system.

The system and method of the present invention, through unique processors and generators executing a unique sequence of steps, produces more accurate translations that can account for various speech characteristics (e.g., idioms, sarcasm, jokes, tone, phonemes, etc.). In addition, the audio translations match the speakers' voice identities, tones, intonations, emotions, etc. by incorporating digital representations of the corresponding audio signal (e.g., MelSpectogram and/or raw audio waveforms) with generative AI. Furthermore, the system can generate/manipulate video such that the speakers' faces (at least the speakers' lips) appear as if they are natively speaking the generated audio through high-resolution generative AI including progressive GANs.

As provided in FIG. 1, the present invention generally includes input media file 102, which may include input video 104, input audio 106, and may optionally include input transcription 108. Input language 110 and output language 112 are also provided to translator 114. Translator 114 uses the input information to create output media 122. Output media 122 may include output video 116, output audio 118, and/or output transcription 120 with the language translated into the output language. Because input media file 102 may include input video 104, input audio 106, and/or input transcription 108 some embodiments include an identification system configured to detect audio, video, and/or transcription information from input media file 102 to determine what information will be included in the translation process and whether the translation process will include both audio and video translation/manipulation.

Input media 102 may be converted and/or provided in a computer readable format when provided to one or more of the various preprocessors or generators of which translator 114 may be comprised as described herein. Non-limiting examples of computer readable formats for the various inputs includes binary vectors and vectors of character strings. Binary vectors may be any known in the art including but not limited to 1-hot vectors and multi-class vectors. Likewise, the vector of character strings may be any known in the art. Some embodiments convert one or more of the inputs into a character string of international phonetics alphabet (IPA). As will be explained in subsequent paragraphs, using IPA character strings reduces the errors associated with distinctions in the phonetics between the same words in different languages.

In some embodiments, the user identifies input language 110 and/or output language 112. In some embodiments input language 110 and output language 112 is denoted and provided in a computer readable format similar to those described herein. For example, input language 110 and output language 112 can be provided in the form of binary vectors the size of all possible languages where a single 1-state corresponds to the respective languages. In some embodiments, input language 110 is identified automatically through speech recognition software. Similarly, some embodiments include speech-to-text (STT) systems/software to automatically create input transcription 108.

As explained in greater detail below, some embodiments of the present invention include one or more processors (also referred to as "preprocessors") to identify, extract, and/or manipulate input information prior to translation. Moreover, some embodiments include a translator comprised of multiple generators configured to improve the translations through synthetic generation of various information. Some embodiments of the present invention further include postprocessors configured to improve the quality of the translations and/or the quality of the output media. These various components are discussed in greater detail in subsequent sections.

Figure 2:
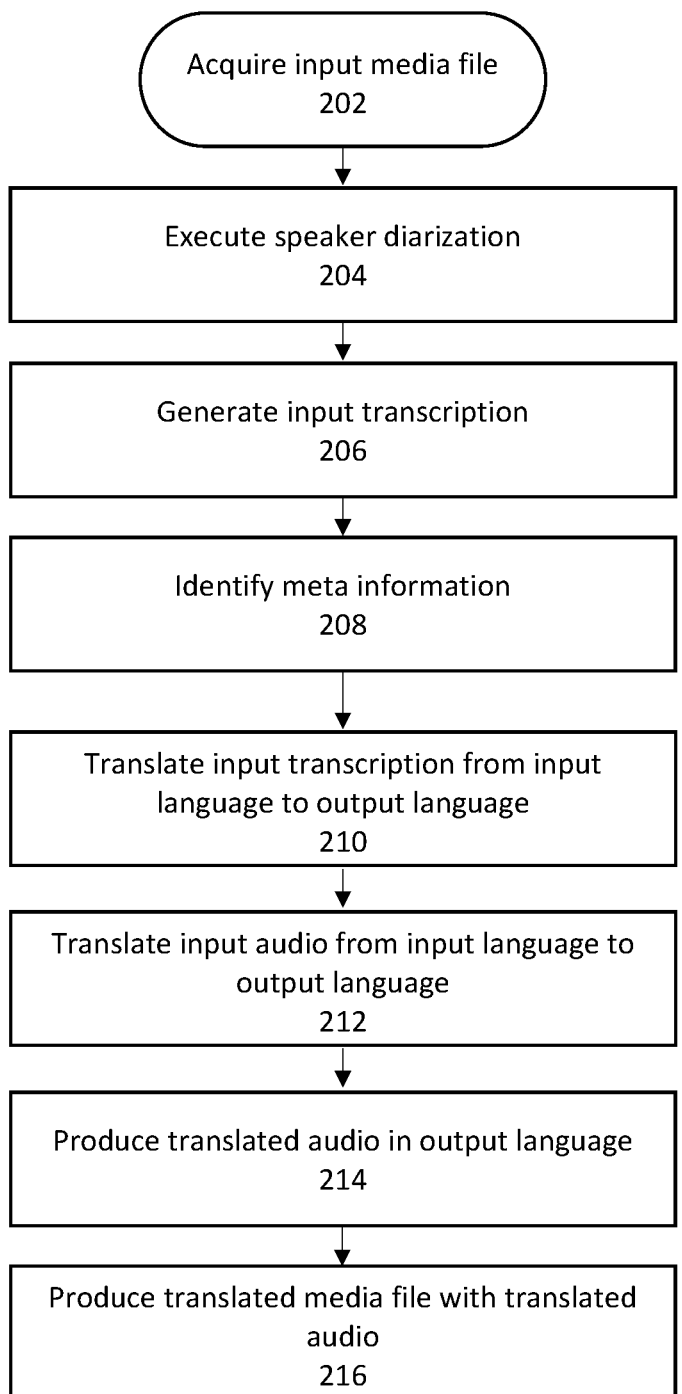
FIG. 2 is a flowchart of an embodiment of the present invention.

FIG. 2 provides a broad overview of translation process 200, which corresponds at least in part with the diagrams in FIGS. 3-7. As depicted, the exemplary embodiment of translation process 200 includes first receiving or acquiring a digital input media file 102 at step 202. The input media file may be acquired or provided via any systems and methods known in the art.

As previously noted, input media file 102 may include video, audio, and/or transcript information. For the sake of brevity and clarity, the following description will be in reference to input media file 102 having input video 104 with input audio 106. If the input media file is simply an audio file then the steps corresponding to the video translation would not be performed. Furthermore, while input media file 102 can be provided as multiple or a single digital input file, the exemplary figures depict input video 104 and input audio 106 as separate inputs.

Figure 3:
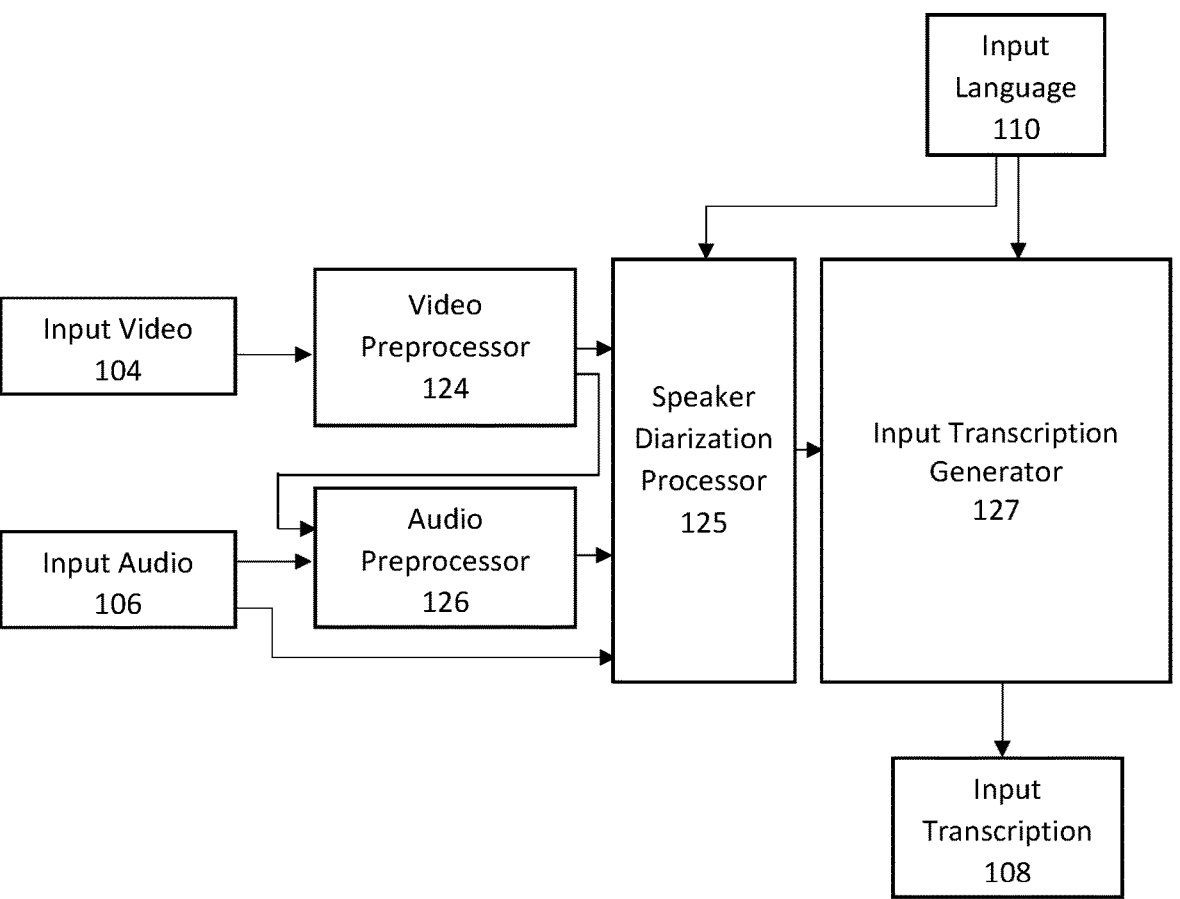
FIG. 3 is a block diagram of an embodiment of the process for generating input transcriptions.

Referring now to FIGS. 3, some embodiments include steps for preprocessing input media 102 as described below. Input media 102 may be provided to video preprocessor 124 and/or audio preprocessor 126. In some embodiments, these preprocessors are configured to improve the ability for speaker diarization processor to correctly partition input audio 106 and for input transcription generator 127 to generate a more accurate input transcription 108.

Audio preprocessor 126 may include processes for partitioning audio content for each speaker into separate audio tracks, removing or cleaning up background noise, and enhancing voice quality data. These processes may be performed using any known systems and methods capable of performing the processes enumerated herein. In some embodiments, audio preprocessor 126 is also configured to automatically identify input language 110 using voice recognition software such as those known in the art.

Video preprocessor 124 may include processes for identifying and tracking subjects within the video. For example, video preprocessor 124 may employ facial detection software, using e.g., 8 pt 2D landmarks, 68 pt 2D landmarks, other 2D facial landmarks, other 3D facial landmarks, to create facial bounding boxes that track each subject depicted in the video.

In some embodiments, video preprocessor 124 may employ body tracking software using e.g., 13 pt 2D landmarks, other 2D body landmarks, other 3D body landmarks, etc., to create body bounding boxes to track each subject. Any type of bounding box or identity tracking software can be used to identify and track subjects throughout the frames of a video. In some embodiments, video preprocessor 124 is configured to identify and track lip movements, which are used to determine which speaker is speaking during a particular vocal segment in the video.

In some embodiments, the output of video preprocessor 124 is fed into audio preprocessor 126. Supplying video information to audio preprocessor 126 allows audio preprocessor 126 to better understand words/phenomes that are difficult to distinguish in audio alone (e.g., pronunciation of "B" vs "V").

Referring now to FIGS. 2-3, after input media file 102 is acquired, speaker diarization is executed at step 204. In some embodiments, input media 102 and input language 110 are provided to speaker diarization processor 125 at step 204. In some embodiments, input audio 106 is provided to speaker diarization processor 125 without input video 104. Some embodiments provide original input audio 106 along with preprocessed audio outputs from audio preprocessor 126 to speaker diarization processor 125.

Speaker diarization processor 125 is configured to partition input audio 106 into homogeneous vocal segments according to an identifiable speaker. Ultimately, speaker diarization processor 125 performs a series of steps to identify one or more speakers in input media 102 and associate each string of speech (also referred to as a vocal segment) with the proper speaker. In some embodiments, the outputs from speaker diarization processor 125 include a series of vocal segments corresponding to input audio 106 with each segment including a speaker identifier or a reference to a speaker's identity. In some embodiments, speaker diarization processor 125 is further configured to capture time-codes for each word/syllable/phoneme in the audio (e.g., the start and end time for each word), identify who is speaking, identify the words spoken, and identify the associated characteristics of the speaker. The outputs from speaker diarization processor 125 can further include identification and associated time codes for coughs, sneezes, pauses in speech and other non-verbal audio segments or non-verbal noises created by a speaker. Like the other speaker diarization information, this data is fed through the whole system. Speaker diarization processor 125 may be any speaker diarization system known in the art that is configured to identify and associate a speaker with a particular vocal segment and/or capture any of the other information described above.

Some embodiments of speaker diarization processor 125 are further configured to associate a particular vocal segment with a speaker based on input video 104. This is accomplished by tracking each speaker's face, identifiable characteristics and/or facial movements. For example, some embodiments use facial trajectory analysis to track, identify, and capture characteristics of the speaker for a particular vocal segment. In such embodiments, the outputs from speaker diarization processor 125 further include the facial trajectory data associated with the series of vocal segments. The outputs from speaker diarization are not necessarily the video itself, but instead computer readable data with the association's contained therein or associated therewith.

The data associated with facial trajectory analysis may include the start and end time during which the face is depicted, individual subject identities compared to others, gender, time on screen, time of speaking based on audio, and lip sync analysis to identify who is talking. All of this information can be used to determine who is speaking and how their identifiable characteristics may impact their vocal characteristics. For example, recognition of a masculine tone may help identify the speaker as a male subject when the video depicts both a male and a female subject speaking at the same time.

Associating facial information with each vocal segment further helps in producing synced video 146 as described in subsequent sections. However, some input media 102 do not include input video 104. In addition, some embodiments of the present invention output translated audio without further syncing the translated audio to input video 102. In these instances, speaker diarization processor 125 does not need to associate the vocal segments with facial tracking data.

Following speaker diarization, the outputs are provided to input transcription generator 127 at step 206 to generate an input transcription. In reference to FIG. 3, each speaker-identified segment of audio following speaker diarization is provided to input transcription generator 127 to convert the vocal segments into segmented input transcriptions 108. Input transcriptions 108 may be generated using any known system or method configured to produce input transcriptions 108 containing the data described below.

Input transcriptions 108 may include anything from only the words spoken to highly detailed data about mouth movements, phonemes, timestamps, and other such descriptions. Often, input transcription 108 will include language(s) being spoken, identification of names/proper nouns, sentiment analysis, time stamps/time indices of words and/or syllables, and/or phonemes with timestamps for each separate person speaking in the audio.

In some embodiments, the original unprocessed input video 104 and/or input audio 106 is also provided to input transcription generator 127. In some embodiments, the outputs from video preprocessor 124 and/or audio preprocessor 126 are also provided to input transcription generator 127. Some embodiments further provide input language 110 to input transcription generator 127.

In some embodiments, input transcriptions 108 are provided or prepared by a user. In such situations, the present invention either does not include input transcription generator 127 or simply bypasses the step of generating input transcription 108. Some embodiments present input transcription 108 to a user for review and provide a user with the ability to modify the transcription. The user can modify the inputs and then send the modified inputs to input transcription generator 127 to produce improved outputs.

Figure 4:
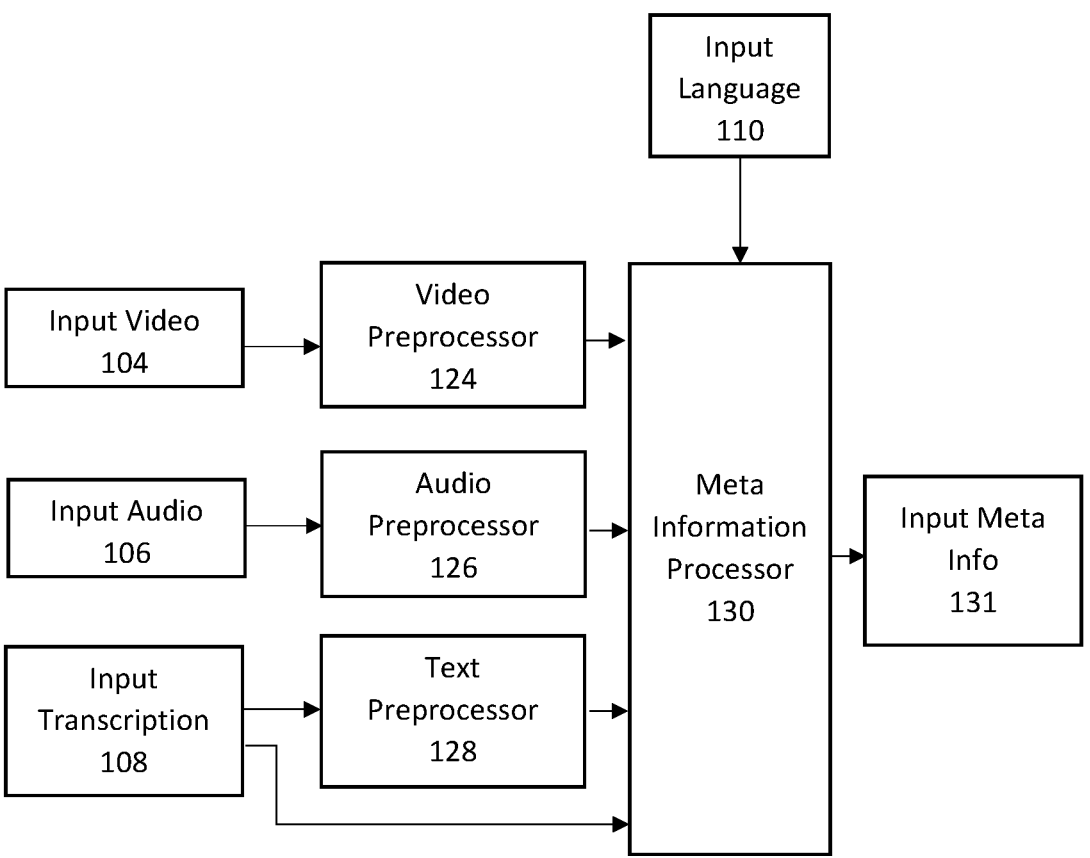
FIG. 4 is a block diagram of an embodiment of the process for generating input meta information.
Figure 5:
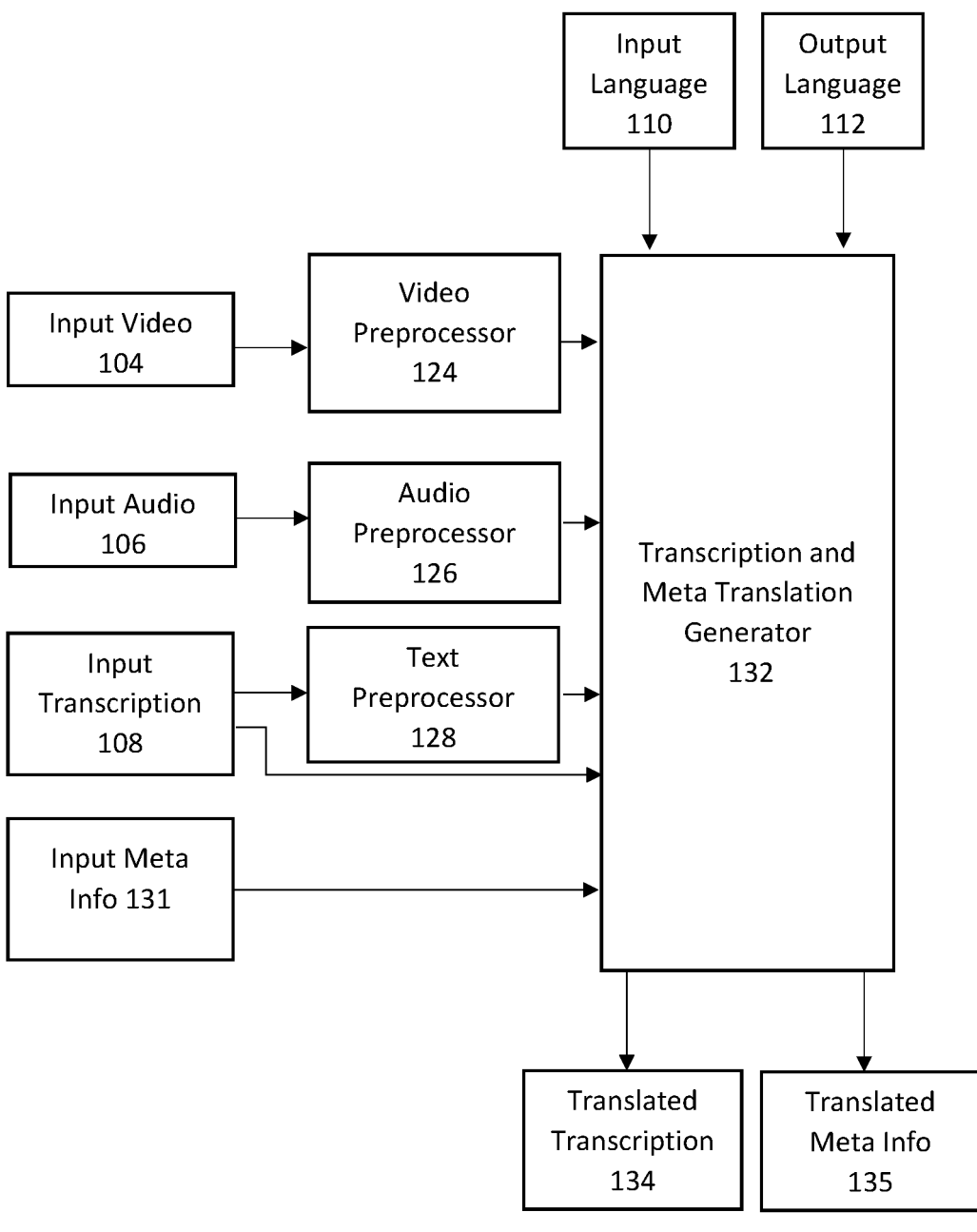
FIG. 5 is a block diagram of an embodiment of the process for generating translated transcriptions and/or translated meta information.

Referring now to FIGS. 2 and 4, some embodiments further include identifying meta information from input audio 106 and input transcription 108 at step 208. As depicted in FIG. 4, some embodiments send input audio 106, input transcription 108, and input language 110 to meta information processor 130. In some embodiments, input audio 106 and/or input video 104 are provided with the outputs from preprocessors 124 and/or 126 to meta information processor 130. Likewise, some embodiments provide the original input transcriptions 108 and/or input transcriptions 108 after processed through text preprocessor 128.

In some embodiments, text preprocessor 128 is configured to convert text into phoneme analysis and/or perform emotional/sentiment analysis. These analyses may be performed using any known system and methods configured to extract such data from input transcription 108, which includes a data corresponding to vocal segments and the associated speaker diarization data.

Meta information processor 130 may be configured to identify and associate various meta information with each vocal segment. Non-limiting examples of meta information include emotion, stress, pacing/prosody/rhythm, phoneme analysis, tone, age, gender, race. In some embodiments, meta information processor 130 identifies and associates at least emotional data and pacing data with each vocal segment.

Emotion data includes any detectable emotion. Non-limiting examples of emotions include happy, sad, angry, scared, confused, excited, tired, sarcastic, disgusted, fearful, and surprised. Emotion data can further be compiled into a predetermined list of emotions and emotions can be communicated to the one or more processors and generators using computer readable formats, such as 1-hot or multi-class vectors, the second-to-last layer of a neural network or the output of a Siamese network to determine similarity. The same approach can be used for identifying and conveying the various other types of meta information.

Pacing/prosody/rhythm (referred to herein after "pacing") is the measurable time associated with each syllable, word, other phoneme, non-verbal speech (such as cough, laugh, gasp) or pauses in speech with 0.05 s resolution. If the pacing information is known and flows through the data, the generators can produce outputs that match or closely match the same pace. As a result, the translated text, audio, and/or video are generated to have a similar or matching pace to the input audio, video, and/or text.

The various meta information can be identified and generated using any known systems and methods configured to identify and generate one or more of the meta information described above. In some embodiments, the various meta information can be identified and generated using any known systems and methods configured to identify and generate emotional data and pacing data for each vocal segment.

Meta information processor 130 identifies and captures meta information for each vocal segment and associates the meta information with each vocal segment. This combination of information is captured as input meta information 131. Capturing and providing this information captures uniquities during speech. Using this information, AI generators can be trained on characteristics to know what impact emotions have on speech. After training, the AI generator knows when a statement includes an emotion and can produce synthetic audio that includes the identified emotion. When properly trained, the meta information processor can produce multi-labeled outputs, for example, audio with various levels of anger or different accents, emotions, pacing, etc.

In some embodiments, meta information processor 130 produces input meta information 131 in which the meta information and speaker diarization data are associated with each vocal segments. Thus, input meta information 131 includes pacing and timecodes on speaker diarization data in formats useable by transcription and meta translation generator 132. In some embodiments, input meta information 131 includes speaker diarization data converted to phonemes, which subsequently allows the system to adjust translated outputs to match the inputs based on phoneme similarity.

In some embodiments, input meta information 131 is provided or prepared by a user. In such situations, the present invention either does not include meta information processor 130 or simply bypasses the step of generating input meta information 131. Some embodiments present input meta information 131 to a user for review and provide a user with the ability to modify input meta information 131. Some embodiments include steps for presenting the inputs to a user for modification and the user can modify the inputs and then send the modified inputs to AI meta information processor 130 to produce improved outputs.

At step 210, the present invention translates input transcription 108 from input language 110 to output language 112. As exemplified in FIG. 5, various inputs are provided to transcription and meta translation generator 132, which translates the input transcription into output language 112 in the form of translated transcription 134 and translated meta information 135. While translated transcription 134 and translated meta information 135 can be provided as a single dataset, the figures depict the information as separate for clarity. The output(s) from transcription and meta translation generator 132 can include things like pacing, emotion, inflection, tone, etc.

In some embodiments, the inputs only include input transcription 108, outputs from text preprocessor 128, and input meta information 131. In some embodiments, the inputs also include input video 104, audio input 106, outputs from video preprocessor 124 and/or outputs from audio preprocessor 126. In addition, input language 110 and output language 112 is provided to transcription and meta translation generator 132. Some embodiments only send input transcription 108 (raw or pre-processed) and input language 110 and output language 112 to transcription and meta translation generator 132 to produce translated transcription 134. Some embodiments send at least input transcription 108 (raw or pre-processed) and input language 110 and output language 112 to transcription and meta translation generator 132 to produce translated transcription 134.

Including input meta information 131 enables transcription and meta translation generator 132 to produce translated transcription 134 and translated meta information 135 having various speech characteristics identified through input meta information 131. Such characteristics include but are not limited to sarcasm, humor, phonemes, pacing to match phonemes, etc. Supplying input audio 106 and/or the outputs of audio preprocessor 126 to transcription and meta translation generator 132 also makes transcriptions invariant to sarcasm, humor, idioms, and other information contained within the audio. Video information from input video 104 and/or video preprocessor 124 may also be provided as inputs to transcription and meta translation generator 132, which can include other emotional information and further improves translated transcription 134 and translated meta information 135.

In some input media 102, there may be more than one language spoken in input audio 106 (e.g., English and Spanish). This information will often times be within input transcription 108. When translating more than one input language 110, transcription and meta translation generator 132 is provided with specific output languages 112 for each input language (e.g., English to German and Spanish to German or English to German and Spanish to French).

In some embodiments, translated transcription 134 and/or translated meta information 135 are provided or prepared by a user. In such situations, the present invention either does not include transcription and meta translation generator 132 or simply bypasses the step of generating translated transcription 134 and/or translated meta information 135. Some embodiments present translated transcription 134 and/or translated meta information 135 to a user for review and provide a user with the ability to modify translated transcription 134 and/or translated meta information 135. Some embodiments include steps for presenting the inputs to a user for modification and the user can modify the inputs and then send the modified inputs to transcription and meta translation generator 132 to produce improved outputs.

Figure 6:
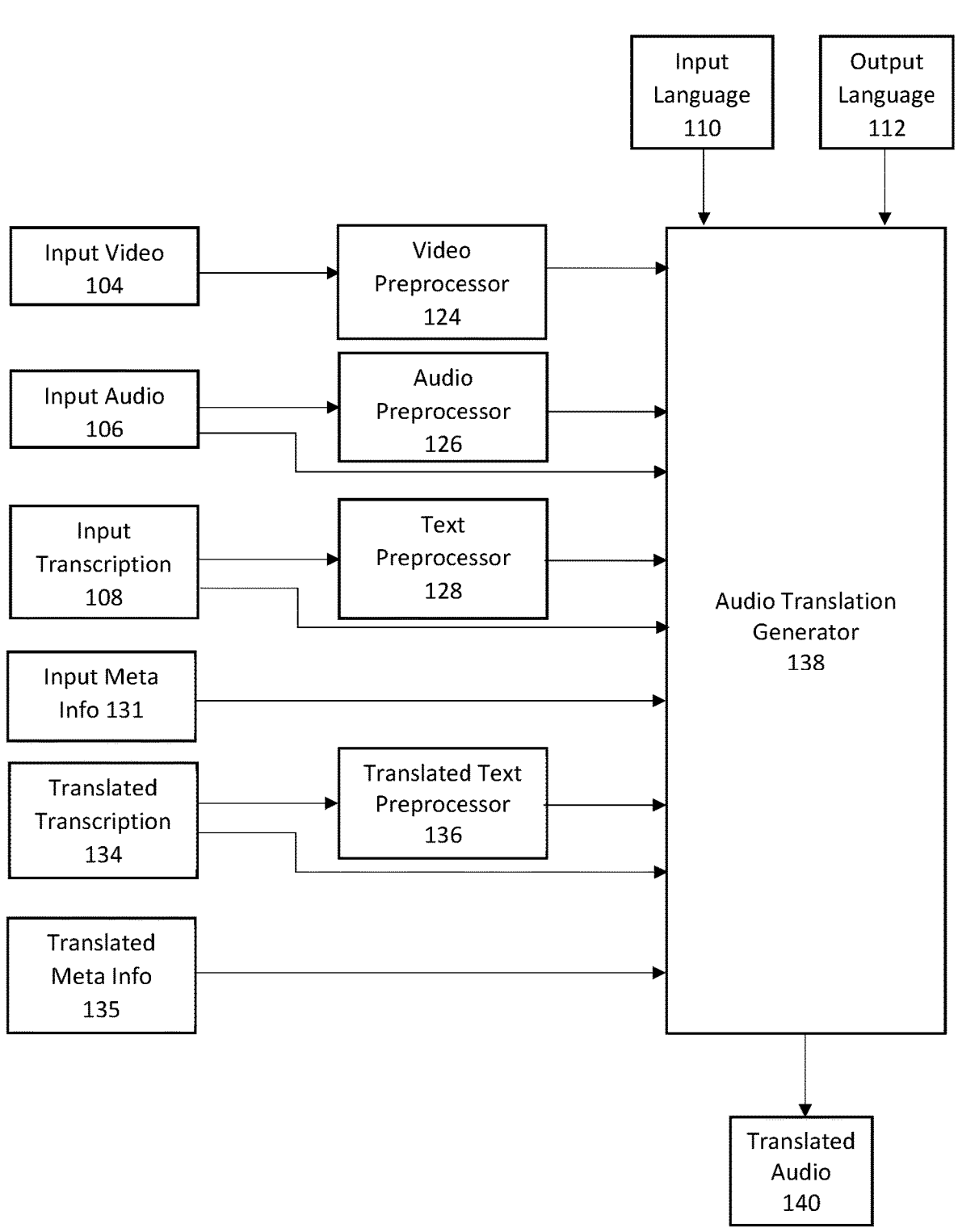
FIG. 6 is a block diagram of an embodiment of the process for generating translated audio.

As detailed in FIGS. 2 and 6, once translated transcription 134 and translated meta information 135 are acquired, the present invention can use audio translation generator 138 to translate input audio 106 from input language 110 to output language 112, thereby producing translated audio 140 at step 214. In some embodiments, the inputs for audio translation generator 138 include output language 112 and translated transcription 134 and/or the outputs from translated text preprocessor 136.

Translated text preprocessor 136 is configured to convert text into phoneme analysis and/or perform emotional or sentiment analysis. These analyses may be performed using any known system and methods configured to extract such data from translated transcription 134, which includes a translated data corresponding to vocal segments and the associated speaker diarization data. Thus, the outputs from translated text preprocessor 136 include the data from these analyses in computer readable formats and the output data can be provided to audio translation generator 138.

Some embodiments further include input meta information 131 and/or translated meta information 135 as inputs to audio translation generator 138. In some embodiments, the inputs for audio translation generator 138 include output language 112 and input audio 106 and/or the outputs from audio preprocessor 126.

As further exemplified in FIG. 6, the inputs to audio translation generator 138 can include input language 110, output language 112 input media 102, outputs from video preprocessor 124 and audio preprocessor 126, input transcription 108, outputs from text preprocessor 128, input meta information 131, translated transcription 134, outputs from translated text preprocessor 136, and/or translated meta information 135.

Some embodiments only send translated transcription 134, translated meta information 135, and output language 112 to audio translation generator 138 in order to generate the translated audio. In some embodiments, output language 112 may be contained within/determined from translated transcription 134. Some embodiments send at least translated transcription 134, translated meta information 135, and output language 112 to audio translation generator 138 in order to generate translated audio 140.

As previously stated, some embodiments also include sending the output from video preprocessor 124 and/or audio preprocessor 126. Adding video and/or audio information improves translation results by incorporating voice characteristics, emotions, speaker identity, etc.

Some embodiments only send input audio 106 (preprocessed and/or raw) and output language 112 to audio translation generator 138 in order to generate translated audio 140. Some embodiments send at least input audio 106 (preprocessed and/or raw) and output language 112 to audio translation generator 138 in order to generate translated audio 140. Input audio 106 may be chunked upon input to reduce audio into manageable chunks (e.g., <15 s or <30 s) and/or improve final results through automated alignment.

When translated transcription 134, translated meta information 135, and output language 112 are the primary or only inputs sent to audio translation generator 138, audio translation generator 138 may include a Text-to-Speech (TTS) generator, including but not limited to a generic 3rd party Cloud TTS system, Custom Cloud TTS system, 3rd party on-device TTS system, or custom on-device TTS system. Audio translation generator 138 may further be configured to identify and incorporate voice characteristics, like gender, age, emotion characteristics etc., gained from pre-processing audio. The resulting translated audio 140 thus includes far more information than what is typically provided in TTS. For example, translated audio 140 matches spoken words, emotion, pacing, pauses, tone, prosody, intensity/tone, stress, vocal identity, etc. As a result, translated audio does not come through in the original person's voice, but the generator closely matches the person's voice. If the generator is trained using training data in which the audio corresponds to the same speaker as in the input media 102, the generator can generate synthetic translated audio with roughly a 99% vocal match. If not trained on audio from the same speaker, the generator can generate synthetic translated audio having a vocal match around 80% or better.

Some embodiments present translated audio output 140 to a user for review and provide a user with the ability to modify translated audio output 140. The user can modify the inputs and then send the modified inputs to audio translation generator 138 to produce improved outputs.

Some embodiments further include a post-processor configured to improve final translated audio output 140. The post processor is configured to stitch translated audio 140 back into a single audio stream with the original audio background sounds, sound effects, etc. In some embodiments, the post processor automatically matches the original audio sound parameters (e.g., from professional audio mixing) and unsupervised, tacit characteristics of the original audio input 106. In some embodiments, the post processor is configured to directly reincorporate information from audio preprocessing such as speaker diarization.

Figure 7:
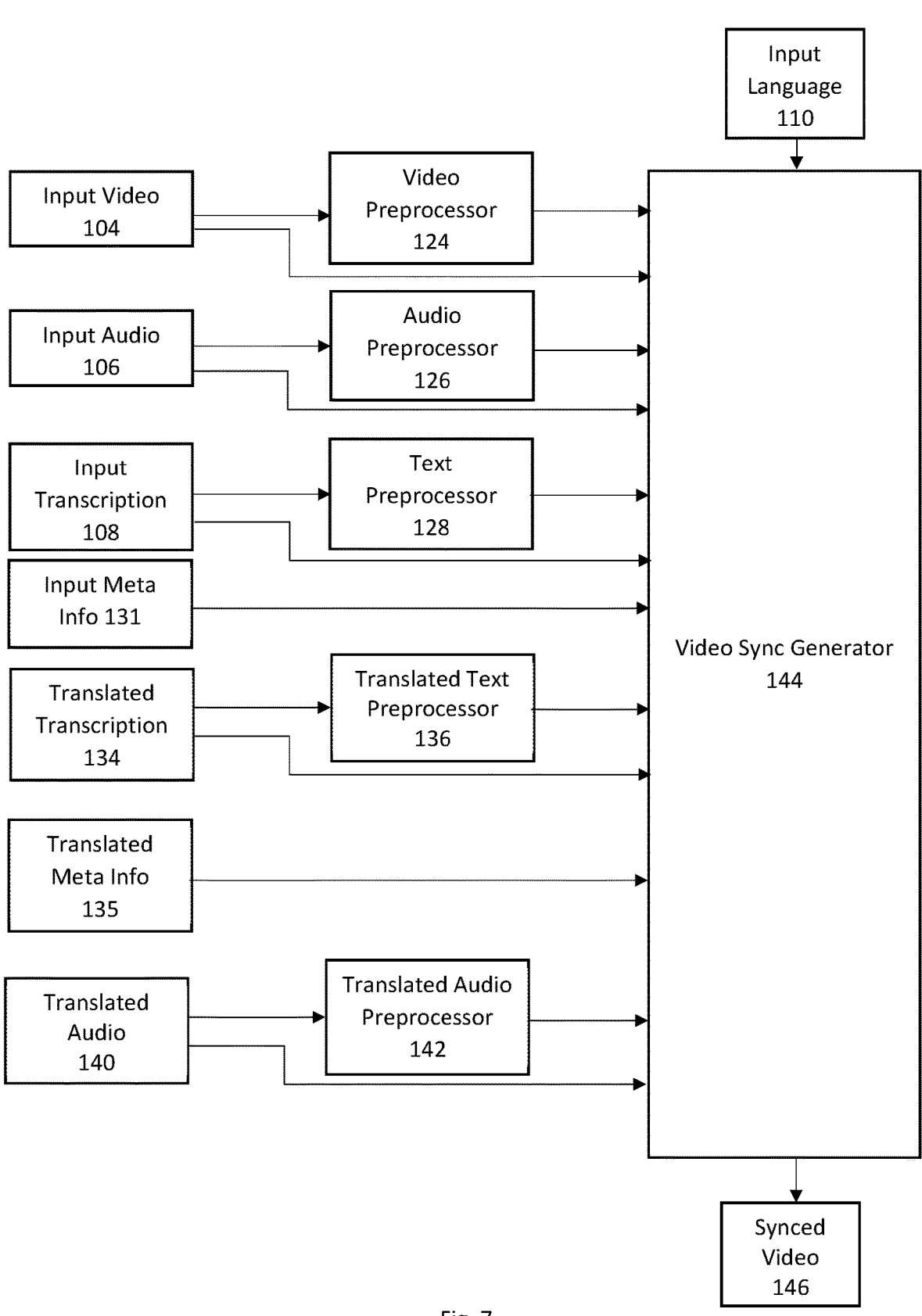
FIG. 7 is a block diagram of an embodiment of the process for generating a synced video with translated audio.

At this point in the translation process, the translated audio 140 can be presented or provided to the end user. Some embodiments, however, further include steps for syncing the facial movements of the speaker to coincide with translated audio 140. Step 216 in FIG. 2 and FIG. 7 provide the details corresponding to this additional process. In some embodiments, input video 104, outputs from video preprocessor 124, and translated audio 140 are provided to video sync generator 144, which outputs synced video 146. Some embodiments only send translated audio 140, the output from video preprocessor 124, and input video 104 to video sync generator 144.

Some embodiments send at least translated audio 140, the output from video preprocessor 124, and input video 104 to video sync generator 144. As exemplified in FIG. 7, some embodiments further provide input language 110, the output from video preprocessor 124, input audio 106, the output from audio preprocessor 126, input transcriptions 108, the output from text preprocessor 128, input meta information 131, translated transcription 134, outputs from translated text preprocessor 136, translated meta information 135, and/or the outputs from translated audio preprocessor 142 to video sync generator 144.

Using the provided information, video sync generator 144 produces synced video 146 in which translated audio 140 is dubbed over input video 104 and the speaker's facial movements coincide with translated audio 140. More specifically, video sync generator 144 creates a translated video and re-combines the translated video back into original video based on bounding boxes and/or facial landmarks, mouth/lip landmarks, etc. to ensure that the speaker's facial movements coincide with translated audio 140.

Some embodiments present synced video 146 to a user for review and provide a user with the ability to modify synced video 146. In some embodiments the user can modify the inputs and then send the modified inputs to produce improved outputs.

In some embodiments, video sync generator 144 includes optical flow network/optical flow loss to reanimate the subject's lips. In some embodiments, the video may be chunked upon input to account for separate faces, scene cuts, etc.

Figure 8:
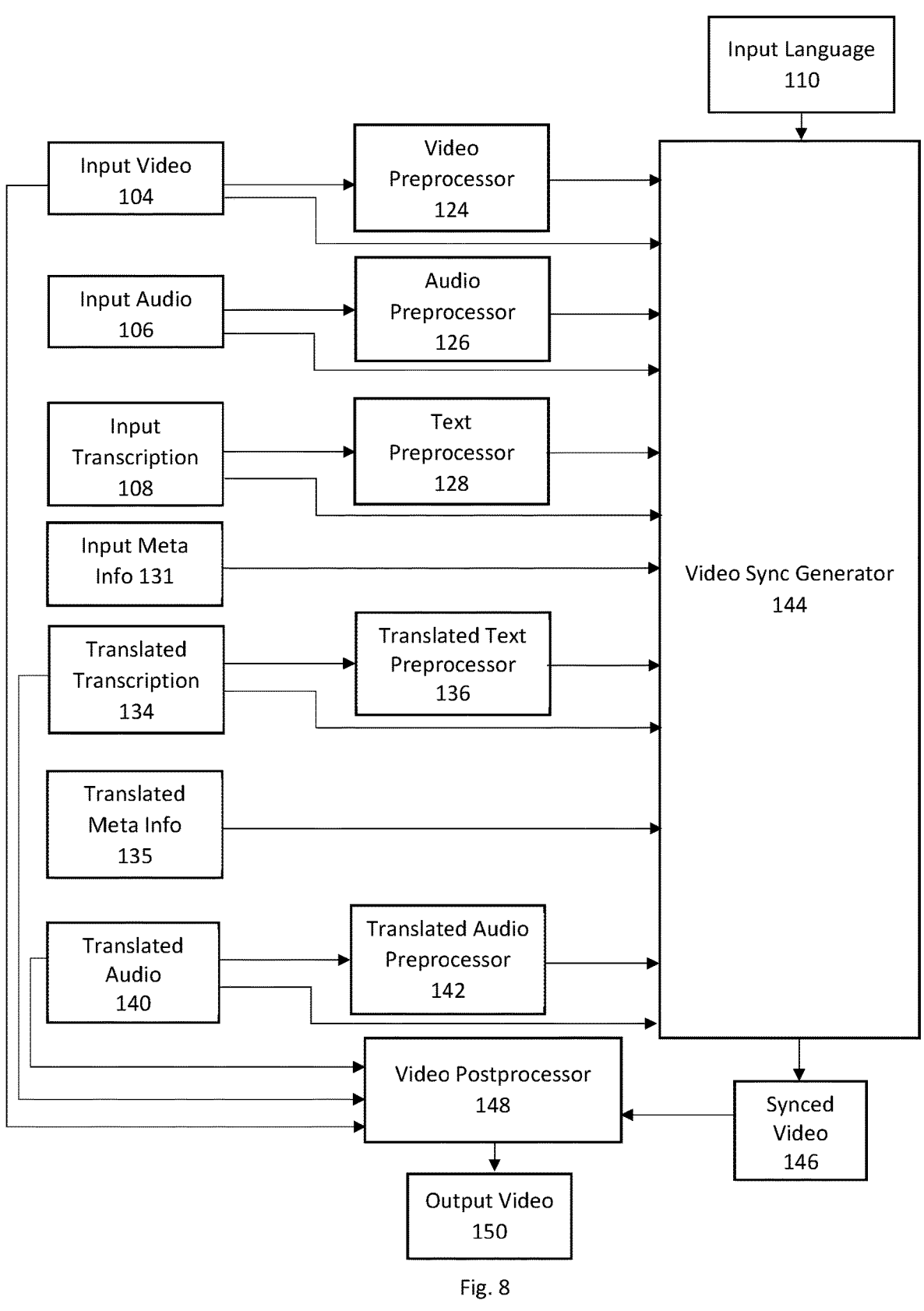
FIG. 8 is a block diagram of an embodiment of the process for generating a synced video with translated audio and executing postprocessing processes to produce a higher quality output video.
Figure 9:
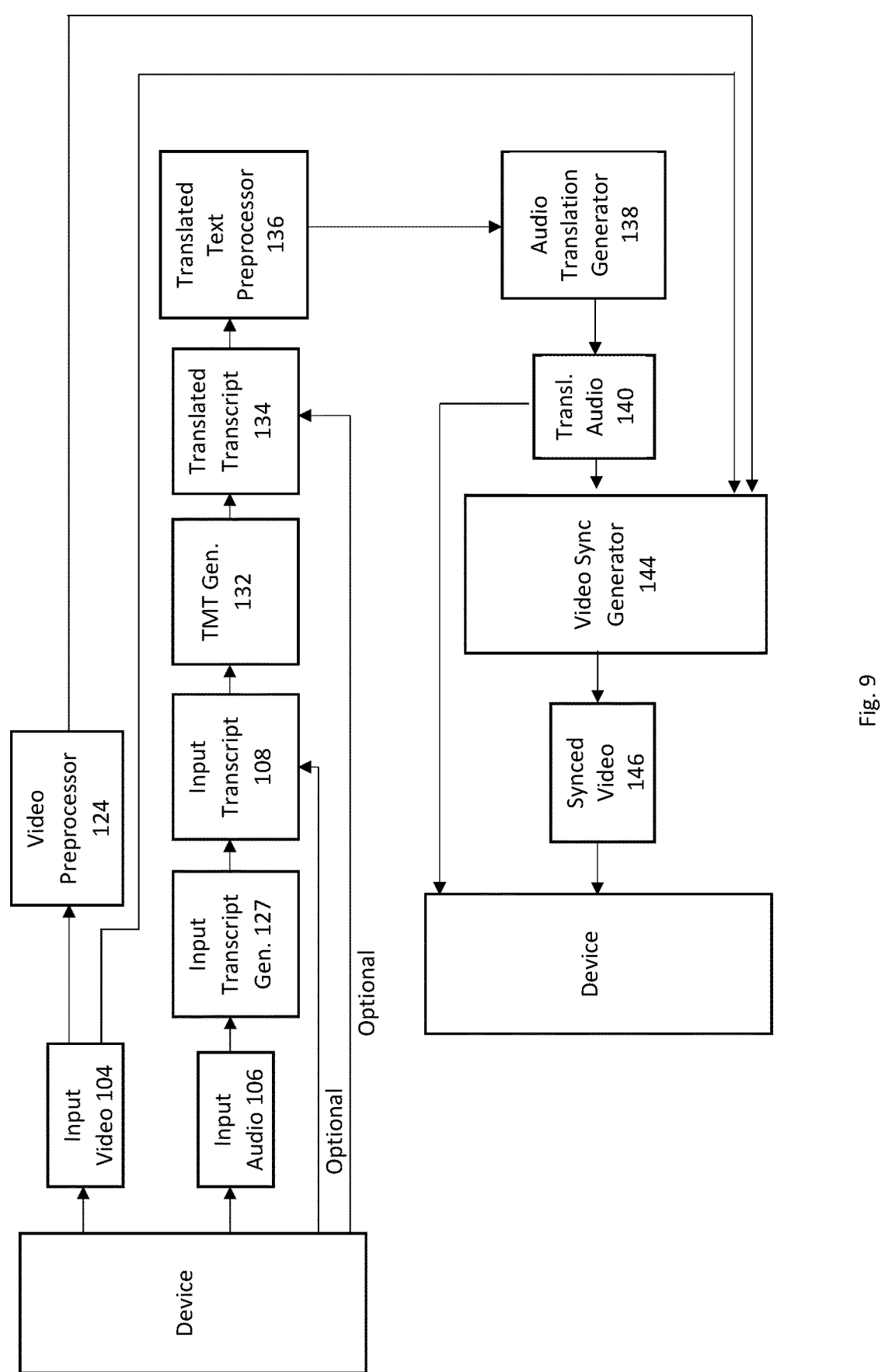
FIG. 9 is a block diagram of an implementation of an embodiment of the present invention.

As exemplified in FIG. 8, some embodiments further include postprocessing steps configured to reintegrate various data into synced video 146. Some embodiments include video postprocessor 148 configured to perform these steps. After postprocessing, output video 150 can be provided to the user.

In some embodiments, video postprocessor 148 receives input video 104, translation transcription 134, translated audio 140, and synced video 146 as inputs. Video postprocessor 148 uses these inputs to automatically match original video optical parameters (e.g., from the professional video mixing, video coloring, etc.) and unsupervised, tacit characteristics of the original video input.

Some embodiments of the present invention use GANs/ML/AI (collectively referred to as "AI") to improve upon the outputs and efficiency of the translation process described above. The various AI may be trained in supervised, unsupervised, and/or semi-supervised manner. The resulting trained AI processors and generators can then be used to produce substantially improved translations in a more efficient manner.

Generally, embodiments employing AI have two types of AI based on the intended function of the AI systems. These AI systems can generally be separated into preprocessing AI and generative AI. AI processors/preprocessors are systems that are designed to more effectively and efficiently perform a task, such as converting, extracting, identifying, or compiling information. In contrast, AI generators are systems configured to generate synthetic information, such as manipulated or transformed media.

The following systems may be replaced by preprocessing AI: video preprocessor 124, audio preprocessor 126, speaker diarization processor 125, text preprocessor 128, translated text preprocessor 136, translated audio preprocessor 142, and meta information processor 130. Likewise, the following generators may be replaced by generative AI: input transcription generator 127, transcription and meta translation generator 132, translated text preprocessor 136, audio translation generator 138, translated audio preprocessor 142, and video sync generator 144. Each of the various preprocessing AI and generative AI are individually detailed below.

Video Preprocessor

In some embodiments of the present invention, video preprocessor 124 is a preprocessing AI. Video preprocessor 124 may include processes (such as those identified in previous sections) for identifying and tracking subjects within the video using identification and tracking systems and methods. These systems and methods may be any AI processing systems known in the art. For example, video preprocessor 124 may include facial landmark analysis, facial tracking algorithms, facial cropping and alignment algorithms, scene identification, and restoration and super resolution.

In some embodiments, video preprocessor 124 includes AI configured to identify and track lip movements. By tracking lip movements, the AI can determine which speaker is speaking during a particular vocal segment in the video. The system and method used to track lip movements may be any AI processing systems known in the art, including but not limited to facial landmark analysis, facial tracking algorithms, facial cropping and alignment algorithms, classification, segmentation, and lip-to-text algorithms.

In some embodiments, video preprocessor 124 is configured to receive input video 104 and/or computer readable representations of input video 104. Likewise, video preprocessor 124 outputs computer readable data. In some embodiments, the computer readable data are provided in binary vectors and/or vectors of character strings. Binary vectors may be any known in the art including but not limited to 1-hot vectors and multi-class vectors. Likewise, the vector of character strings may be any known in the art. Some embodiments use character strings based on IPA. Using IPA character strings reduces the errors associated with distinctions in the phonetics between the same words in different languages.

Some embodiments present the outputs of the video preprocessor AI to a user for review and potentially modification. Even when the video preprocessor AI is trained, there may be instances in which the outputs could be improved by a user. Thus, some embodiments include steps for presenting the outputs to a user for modification.

Audio Preprocessor

In some embodiments of the present invention, audio preprocessor 126 is a preprocessing AI. AI audio preprocessor 126 may include processes for partitioning audio content for each speaker, removing or cleaning up background noise, and enhancing voice quality data. These processes may be performed using any known AI preprocessors capable of performing the processes enumerated herein. For example, AI audio preprocessor 126 may include vocal source separation, noise reduction, audio restoration and super resolution.

Like AI video preprocessor 124, AI audio preprocessor 126 is configured to receive input audio 106 and/or computer readable representations of input audio 106. Likewise, AI audio preprocessor 126 outputs computer readable data, such as those described herein.

Some embodiments present the outputs of AI audio preprocessor 126 to a user for review and potentially modification. Even when AI audio preprocessor 126 is trained, there may be instances in which the outputs could be improved by a user. Thus, some embodiments include steps for presenting the outputs to a user for modification.

Speaker Diarization Processor

In some embodiments of the present invention, speaker diarization (SD) processor 125 is a preprocessing AI. AI SD processor 125 may include processes for partitioning input audio 106 into homogeneous vocal segments according to an identifiable speaker. AI SD processor 125 may be any system and method known to a person of ordinary skill in the art for executing speaker diarization. Ultimately, AI SD processor 125 performs a series of steps to identify one or more speakers in input media 102 and associate each string or vocal segment with the proper speaker. In some embodiments, the outputs from AI SD processor 125 include a series of vocal segments corresponding to input audio 106 with each segment including a speaker identifier or a reference to a speaker's identity. In some embodiments, AI SD processor 125 is further configured to capture time-codes for each word in the audio, who is speaking, what the speaker is saying, when each speaker is speaking, speaker identities, the spoken words, and associated characteristics of the speaker. AI SD processor 125 can further identify coughs, sneezes, pauses in speech and other non-verbal audio segments or non-verbal noises created by a speaker. Like the other SD information, this data is fed through the whole system.

Some embodiments of AI SD processor 125 are further configured to associate a particular vocal segment with a speaker based on input video 104. This is accomplished by tracking each speaker's face, identifiable characteristics and/or facial movements. For example, some embodiments use facial trajectory analysis to track, identify, and capture characteristics of the speaker for a particular vocal segment. In such embodiments, the outputs from AI SD processor 125 further include the facial trajectory data associated with the series of vocal segments. The outputs from speaker diarization are not necessarily the video itself, but instead computer readable data with the association's contained therein or associated therewith.

The data associated with facial trajectory analysis may include the start and end time during which the face is depicted, individual subject identities compared to others, gender, time on screen, time of speaking based on audio, and lip sync analysis to identify who is talking. All of this information can be used to determine who is speaking and how their identifiable characteristics may impact their vocal characteristics.

AI SD processor 125 may be any AI speaker diarization system known in the art that is configured to identify and associate a speaker with a particular vocal segment. For example, AI SD preprocessor 125 may be a third-party SD tool provided by AWS, Google, IBM, etc. or a custom implementation utilizing speech activity detection, voice segmentation, speaker embedding, segment clustering, affinity matrix, MAP-encoding, based on CNNs, RNNs, LSTMs, GNNs, Transformers, GANs, or other ML architecture.

AI SD preprocessor 125 is configured to receive input media 102 and input language 110 in a computer readable format, such as those described herein. In some embodiments, input audio 106 is provided to AI SD processor 125 without input video 104. In some embodiments, input video 104 and/or input audio 106 are provided to AI SD processor 125. Some embodiments provide original input audio 106 along with preprocessed audio outputs from audio preprocessor 126 to AI SD processor 125.

Like previously described AI preprocessors, AI SD preprocessor 125 outputs computer readable data, such as those described herein. More specifically, AI SD preprocessor 125 outputs data in which each vocal segment includes a speaker identity.

Some embodiments present the outputs of AI SD preprocessor 125 to a user for review and potentially modification. Even when AI SD preprocessor 125 is trained, there may be instances in which the outputs could be improved by a user. Thus, some embodiments include steps for presenting the outputs to a user for modification.

Text Preprocessor

In some embodiments of the present invention, text preprocessor 128 is a preprocessing AI. AI text preprocessor 128 may include processes for detecting and analyzing phonemes within text such as input transcription 108. AI text preprocessor 128 may further include processes for detecting and analyzing emotions/sentiments within text, parts of speech, proper nouns, and idioms. These processes may be performed using any known AI preprocessors capable of performing the processes enumerated herein. For example, AI text preprocessor 128 may include phonetic analysis based in IPA or similar system generated through dictionary lookup or transformer model or GAN model, sentiment analysis, parts of speech analysis, proper noun analysis, and idiom detection algorithms.

AI text preprocessor 128 is configured to receive input transcription 108 and/or computer readable representations of or data associated with input transcription 108. In some embodiments, these inputs include SD data corresponding to each vocal segment on account of the SD processor 125 and the input transcription generator 127. AI text preprocessor 128 outputs the phoneme and/or emotion data as computer readable data, such as those types described herein. In addition, this data is output in association with the SD data corresponding to each vocal segment.

Some embodiments present the outputs of AI text preprocessor 128 to a user for review and potentially modification. Even when AI text preprocessor 128 is trained, there may be instances in which the outputs could be improved by a user. Thus, some embodiments include steps for presenting the outputs to a user for modification.

Meta Information Processor

In some embodiments of the present invention, meta information processor 130 is an AI generator. AI meta information processor 130 is configured to identify and generate various meta information associated with each vocal segment. Non-limiting examples of meta information include emotion, stress, pacing/prosody/rhythm, phoneme analysis, age, gender, race. In some embodiments, AI meta information processor 130 identifies and generates at least emotional data for the words in each vocal segment.

AI meta information processor 130 may be any AI processor configured to identify and generate one or more of the meta information described above. Non-limiting examples of AI processors include CNNs, RNNs, LSTMs configured to perform facial emotion detection, facial age detection, facial gender detection, facial similarity vector generation, lip-prosody analysis, vocal emotion detection, vocal age detection, vocal gender detection, vocal prosody analysis, vocal intensity analysis, vocal pitch detection, vocal activity detection, text emotion detection, and text semantic detection.

In some embodiments, AI meta information processor 130 receives input audio 106 and input transcription 108. Some embodiments further include input language 110, input video 104, outputs preprocessor 124, outputs from preprocessor 126, and/or outputs from text preprocessor 128 as input to AI meta information processor 130.

In some embodiments, AI meta information processor 130 generates synthetic input meta information 131 in which the meta information and SD data are associated with each vocal segments. Thus, input meta information 131 includes pacing and timecodes on SD data in format that is useable by transcription and meta translation generator 132. In some embodiments, input meta information 131 includes SD data converted to phonemes, which subsequently allows the system to adjust translated outputs to match the inputs based on phoneme similarity. Some embodiments further include emotion data from audio/video analysis associated with the SD data.

The output meta info from AI meta information processor 130 passes through various other generators directly or indirectly. As a result, the generated translated text, audio, and/or video are generated to have a similar or matching pace to the input audio, video, and/or text.

Some embodiments of AI meta information processor 130 are trained to identify and capture meta information for each vocal segment and generate meta information associated with each vocal segment. AI meta information processor 130 may be comprised of multiple layers of networks with each layer corresponding to a particular type of meta information.

Training AI meta information processor 130 to recognize and generate emotional data further improves the overall system because various sentiments can be captured and inserted into the translations. A direct translation will not recognize or convey various emotions, which can have a major impact on the interpretation of the audio. In addition, without capturing emotion data, the audio translations would not sync with any visible emotions portrayed in the video. In contrast, the trained AI meta information processor 130 can recognize and generate emotion data, which carries through the subsequent preprocessors and generators.

Because AI meta information processor 130 is trained, it can generate meta information corresponding to uniquities during speech. For example, AI meta information processor 130 can be trained on characteristics to know what impact emotions have on speech. After training, AI meta information processor 130 knows when a statement includes an emotion and can generate corresponding meta data. Subsequent AI generators are then able to generate synthetic audio that includes the identified emotion. When properly trained, the meta information processor can produce multi-labeled outputs, for example, audio with various levels of anger or different accents, emotions, pacing, etc.

In some embodiments, AI meta information processor 130 is trained on audio and/or pre-processed video information (e.g., cropped faces, detection of mouth movements, etc.) to improve results. Audio information carries intonation and meaning. Thus, a trained AI meta information processor 130 (in unsupervised or semi-supervised manner) will improve transcription results beyond literal meaning. Supplying audio makes transcriptions invariant to sarcasm, humor, idioms, and other information contained within the audio.

Translated Text Processor

In some embodiments of the present invention, translated text preprocessor 136 is a preprocessing AI. AI translated text preprocessor 136 may include processes for detecting and analyzing phonemes within text such as translated transcription 134. AI translated text preprocessor 136 may further include processes for detecting and analyzing emotions/sentiments with text, parts of speech, proper nouns, and idioms. These processes may be performed using any known AI preprocessors capable of performing the processes enumerated herein. For example, AI translated text preprocessor 136 may include phonetic analysis based in IPA or similar system generated through dictionary lookup or transformer model or GAN model, sentiment analysis, parts of speech analysis, proper noun analysis, and idiom detection algorithms.

AI translated text preprocessor 136 is configured to receive translated transcription 134 and/or computed readable representations of or data associated with input translated transcription 134. In some embodiments, these inputs include SD data corresponding to each vocal segment on account of the SD processor 125 and the input transcription generator 127. In some embodiments, the inputs to AI translated text preprocessor 136 further include input and/or translated meta information.

AI translated text preprocessor 136 output the phoneme and/or emotion data as computer readable data, such as those types described herein. In addition, this data is output in association with the SD data and/or meta information corresponding to each vocal segment.

Some embodiments present the outputs of AI translated text preprocessor 136 to a user for review and potentially modification. Even when AI translated text preprocessor 136 is trained, there may be instances in which the outputs could be improved by a user. Thus, some embodiments include steps for presenting the outputs to a user for modification.

Translated Audio Preprocessor

In some embodiments of the present invention, translated audio preprocessor 142 is a preprocessing AI. AI translated audio preprocessor 142 may include processes for recombining partitioned audio content for each speaker, removing or cleaning up background noise, and enhancing voice quality data. For example, AI translated audio preprocessor 142 may include vocal source identification, noise reduction, audio restoration and super resolution.

AI translated audio preprocessor 142 is configured to receive translated audio 140 and/or computer readable representations of or data associated with translated audio 140. In some embodiments, these inputs include SD data and meta information corresponding to each vocal segment. Likewise, the outputs may also include SD data and meta information corresponding to each vocal segment. Furthermore, the input and output data may be in any computer readable format, such as those types described herein.

Some embodiments present the outputs of AI translated audio preprocessor 142 to a user for review and potentially modification. Even when AI translated audio preprocessor 142 is trained, there may be instances in which the outputs could be improved by a user. Thus, some embodiments include steps for presenting the outputs to a user for modification.

The outputs of the various preprocessing AI described above include trajectory analysis (e.g., faces, cropped, aligned, separate identities, timecodes, positions), identity characteristics (e.g., age, race, gender, etc.), vocal-analysis (e.g., voices, timecode cropped, normalized volume, noise reduction, separate identities), vocal characteristics e.g., (emotion, tone, pacing, etc.), speaker diarization (e.g., aligned text—"who's speaking what when" plus phoneme analysis), text characteristics (e.g., emotional analysis matched to speaker diarization results). These outputs are fed directly into the AI generators described below. The AI generators then generate the new (i.e., translated) text, audio, and video. The voices sound like the original speaker and the video is manipulated so that the speaker's lips match the audio.

Input Transcription Generator

In some embodiments of the present invention, input transcription generator 127 is an AI generator. AI input transcription generator 127 is configured to receive the SD data outputs and synthetically generate an input transcription. In some embodiments, the original unprocessed input video 104 and/or input audio 106 is also provided to input transcription generator 127. In some embodiments, the outputs from video preprocessor 124 and/or audio preprocessor 126 are also provided to input transcription generator 127. Some embodiments further provide input language 110 to input transcription generator 127.

As previously explained, some embodiments of SD data includes segmented audio ("vocal segments") having speaker identification information. Thus, embodiments of AI input transcription generator 127 convert the audio vocal segments into input transcriptions. More specifically, AI input transcription generator 127 synthetically generates transcriptions including anything from only the words spoken to highly detailed data about mouth movements, phonemes, timestamps, and other such descriptions. Often, input transcription 108 will include language(s) being spoken, identification of names/proper nouns, sentiment analysis, time stamps/time indices of words and/or syllables, and/or phonemes with timestamps for each separate subject speaking in the audio. In some embodiments, AI input transcription generator 127 is configured to receive inputs and produce outputs in computer readable formats, such as those described herein.

AI input transcription generator 127 may include a non-AI based algorithm that interprets and integrates the results from SD to export a format that is useable by the remaining components of the system. In some embodiments, AI input transcription generator 127 is a trained AI generator. In some embodiments, AI input transcription generator 127 is trained on audio and/or pre-processed video information (e.g., cropped faces, detection of mouth movements, etc.) to improve results. Audio information carries intonation and meaning. Thus, a trained AI input transcription generator 127 (in unsupervised or semi-supervised manner) will improve transcription results beyond literal meaning. Supplying audio makes transcriptions invariant to sarcasm, humor, idioms, and other information contained within the audio.

Video information may include other emotional information. Thus, training AI input transcription generator 127 on video information in a similar unsupervised or semi-supervised manner further improves transcription translation results.

Some embodiments of AI input transcription generator 127 are further trained on identifying and generating IPA characters from different languages and pacing from audio and/or video inputs. By training AI input transcription generator 127 on identifying and generating IPA characters and pacing, AI input transcription generator 127 develops the ability to convert the inputs from one language to a transcript of IPAs that coincide with the pacing of the input audio. In using IPAs, the system can generate alternative translations for various words to ensure that the translations are able to synchronize from a pacing standpoint. In contrast, a direct translation from one language to another will often result in inconsistent spacing and the final translated audio will not match the pace of the input audio. Moving further downstream, the system will be unable to sync the speaker's lips because the translated audio does not match the pace of the lip movements.

Transcription and Meta Translation Generator

In some embodiments of the present invention, transcription and meta translation (TMT) generator 132 is an AI generator. AI TMT generator 132 is configured to generate translated transcriptions and translated meta information from one or more inputs. AI TMT generator 132 may be any AI generator configured to generate translated transcriptions and translated meta information from one or more inputs. Non-limiting examples include a transformer-based model such as BERT/GPT3 which has been modified to integrate pacing, phoneme, meta, and other information, a GAN-based model, and another AI-based translation model that integrates pacing, phoneme, meta, and other information.

In some embodiments, inputs only include input transcription 108 (raw or preprocessed using text preprocessor 128), input language 110, output language 112, and input meta information 131. In some embodiments, these inputs include pacing information for IPA phonetic characters. Using AI TMT generator 132 allows for the synthetic generation of translated words that not only match the IPA phonetics, but also match the pacing and time codes associated with the IPA phonetics. A strict translation would include pacing errors, but a synthetic generated translation can avoid these errors.

In some embodiments, the inputs also include input video 104, audio input 106, outputs from video preprocessor 124 and/or outputs from audio preprocessor 126. Some embodiments only send input transcription 108 (raw or pre-processed) and input language 110 and output language 112 to AI TMT generator 132 to produce translated transcription 134. Some embodiments send at least input transcription 108 (raw or pre-processed) and input language 110 and output language 112 to AI TMT generator 132 to produce translated transcription 134.

Including input meta information 131 enables AI TMT generator 132 to produce translated transcription 134 and translated meta information 135 having various speech characteristics identified through input meta information 131. Such characteristics include but are not limited to sarcasm, humor, phonemes, pacing to match phonemes, etc. Supplying input audio 106 and/or the outputs of audio preprocessor 126 to AI TMT generator 132 also makes transcriptions invariant to sarcasm, humor, idioms, and other information contained within the audio. Video information from input video 104 and/or video preprocessor 124 may also be provided as inputs to AI TMT generator 132, which can include other emotional information and further improves translated transcription 134 and translated meta information 135.

In some input media 102, there may be more than one language spoken in input audio 106 (e.g., English and Spanish). This information will often times be within input transcription 108. When translating more than one input language 110, AI TMT generator 132 is provided with specific output languages 112 for each input language (e.g., English to German and Spanish to German or English to German and Spanish to French).

Some embodiments of AI TMT generator 132 are trained on data having the one or more inputs described above. In some embodiments, AI TMT generator 132 is trained on audio and/or pre-processed video information (e.g., cropped faces, detection of mouth movements, etc.) to improve results. Audio information carries intonation and meaning. Thus, a trained AI TMT generator 132 (in unsupervised or semi-supervised manner) will improve transcription results beyond literal meaning. Supplying audio makes transcriptions invariant to sarcasm, humor, idioms, and other information contained within the audio.

Video information may include other emotional information, supplied to AI TMT generator 132 during training in a similar unsupervised or semi-supervised manner, which further improves transcription translation results. AI TMT generator 132 may also be trained using video preprocessor outputs fed into the audio preprocessor.

In some embodiments, AI TMT generator 132 can be directly updated by a user. For example, a user can edit the text translation itself by literally correcting the translation. Those translations are then converted into phonemes with AI.

Audio Translation Generator

In some embodiments of the present invention, audio translation generator 138 is an AI generator. AI audio translation generator 138 is configured to generate translated audio from one or more inputs. AI audio translation generator 138 may be any AI generator configured to generate translated audio from the one or more inputs described herein. Non-limiting examples include cloud TTS systems, custom cloud TTS systems, 3rd party on-device TTS systems, custom on-device TTS systems TacoTron2-based methods, MelGAN, Seq2Seq or Wav2Wav based methods, Voice-Cloning based methods, non-autoregressive based methods such as FastSpeech2 and others.

In some embodiments, the inputs for AI audio translation generator 138 include output language 112 and translated transcription 134 and/or the outputs from translated text preprocessor 136. Some embodiments further include input meta information 131 and/or translated meta information 135 as inputs to AI audio translation generator 138.

The inputs to audio translation generator 138 can further include input language 110, input media 102, outputs from video preprocessor 124 and audio preprocessor 126, input transcription 108, and/or outputs from text preprocessor 128.

Some embodiments of AI audio translation generator 138 only require translated transcription 134, translated meta information 135, and output language 112 in order to generate the translated audio. Some embodiments only require input audio 106 (preprocessed and/or raw) and output language 112 to generate translated audio 140.

Some embodiments of AI audio translation generator 138 are trained on data having the one or more inputs described above. In some embodiments, AI audio translation generator 138 is trained on generally the same types of information as the preceding generators, which improve outputs. For example, adding video and/or audio information improves translation results by incorporating voice characteristics, emotions, speaker identity, voice characteristics, gender, age, etc. Because of training, the resulting translated audio 140 thus includes far more information than what is typically provided in TTS. For example, translated audio 140 matches spoken words, emotion, pacing, pauses, tone, prosody, intensity, stress, vocal identity, etc.

Some embodiments of AI audio translation generator 138 are based on a two-stage GAN. The first stage is a conventional GAN with unique encoder and decoder structures to integrate emotion and other meta information into training and inference. Providing these multiple additional encoders and decoders to learn how to recognize and generate emotion and meta characteristics. Training this AI audio translation generator 138 therefore further includes additional unique loss functions configured to detect loss or error between the generated emotion and meta characteristics and the training data.

The second stage GAN is similarly designed but accepts the outputs from the generator in the first stage as the input to the second stage generator. Layering the GANs in this manner improves the realism of the generated outputs and in turn improves the ability of the generators to produce realistic synthetic translations.

In some embodiments, AI audio translation generator 138 performs training/inference on global style tokens; on voice characteristics like gender, age, emotion characteristics etc. gained from pre-processing audio; using "One-Shot" approach; and/or by disentangling speaker, content, and/or emotion representation with or without instance normalization.

Video Sync Generator

In some embodiments of the present invention, video sync generator 144 is an AI generator. AI video sync generator 144 is configured to generate translated audio from one or more inputs. AI video sync generator 144 may be any AI generator configured sync the translated audio with the input video from the one or more inputs described herein. Non-limiting examples include Wav2Lip, PC-AVS, NPFAP, HeadNeRF, FaceFormer, and LipSync3D.

In some embodiments, AI video sync generator 144 is configured to generate synced video from input video 104, outputs from video preprocessor 124, and translated audio 140. Some embodiments only require translated audio 140, the output from video preprocessor 124, and input video 104 to generate synced video 146. Some embodiments of AI video sync generator 144 are configured to receive input language 110, the output from video preprocessor 124, input audio 106, the output from audio preprocessor 126, input transcriptions 108, the output from text preprocessor 128, input meta information 131, translated transcription 134, outputs from translated text preprocessor 136, translated meta information 135, and/or the outputs from translated audio preprocessor 142.

In terms of generator architecture, the architecture of the GAN for training and inference, and training, AI video sync generator 144 is substantially the same as AI audio translation generator 138. However, AI video sync generator 144 is trained and configured to generate synced video 146 from the one or more combinations of inputs described above.

Moreover, AI video sync generator 144 may be based on a retrained "Wav2Lip" GAN; may include multiple progressive GANs, and/or may include optical flow network/optical flow loss considerations.

AI video sync generator 144 may also include AI for re-combining translated video back into original video based on bounding box or facial landmarks, mouth/lip landmarks. It may automatically match original video optical parameters (e.g., from professional video mixing, video coloring, etc.) and unsupervised, tacit "characteristics" of the original video input.

In some instances, an additional second stage generator that was trained by custom GAN to convert MelSpectogram into raw audio waveform (like MelGan, WaveGAN, WaveGlow, VoiceFixer, etc.) is used to improve artifacts and low-resolution from AI video sync generator 144 (acting as the first stage GAN). This second stage generator may be trained on cycle-reconstruction data in a secondary manner to improve artifacts and low-resolution.

Some embodiments of AI video sync generator 144 include a second stage generator to enhance the quality of the synced video. The second stage generator requires only the input video 104 input and synced video 146 to generate the enhanced video. Enhancements include but are not limited to increasing max video size, reducing artifacts (e.g., classic artifacts of GANs and other artifacts specific to the AI video sync generator 144), and enhancing realism. For example, the seconds stage generator can increase the size of the video from (e.g., 96, 256, 512) to a larger size (e.g., 256, 512, 1024 respectively—as high as 2048), which effective enables generator of 4K quality video as the output from video quality generator is reinserted into the original video. The original video may be 3840×2160 or higher while the size of the facial trajectory video may be 512 to 2048.

The second stage generator may be accomplished by a GAN-based network trained in a supervised, unsupervised, or semi-supervised. It may include global style token; may be based on "FewshotVid2Vid", "Pix2PixHD", "GFP-GAN", "Pix2Style2Pix" or "Vid2VidHD" model retrained on custom, proprietary data; may include progressive GANs; and/or may include optical flow network/optical flow loss.

Exemplary Implementations

Implementation 1.1 provided in FIG. 8. As illustrated therein, an existing media file (i.e., audio/video content) is submitted through a computer device, thus becoming input media 102. The media file must include an audio channel. However, the media file can be recorded on a device (e.g., smartphone app, desktop app, web app, etc.) and uploaded; uploaded from device (e.g., smartphone app, desktop app, web app, etc.); or submitted through shared cloud data link (e.g., Google Drive, Dropbox, AWS, etc.).

Transcriptions 108 are obtained from input audio 106 as described herein. Only input audio 106 and input language 110 are needed to obtain transcriptions 108. Some embodiments use 3rd-party cloud based services to obtain the transcriptions (e.g., Google, AWS, etc.); use custom cloud-based techniques to obtain transcriptions written in machine learning libraries (e.g., Pytorch, Tensorflow, Caffe, etc.); use built-in on-device services to obtain transcriptions (e.g., Siri); use custom on-device services to obtain transcriptions written in edge languages (e.g., CoreML, TFLite, etc.) As previously explained, transcriptions 108 often include a dictionary of words and/or syllables and/or phonemes with timestamps for each object (word/syllable/phoneme), designated by each person speaking.

The user may update transcription 108 for the original or translated subscription. The user can correct the transcription in original language and/or add more detailed information about slang, proper nouns, etc. to improve results in original and/or translated language.

Text preprocessor 136 aligns timestamps of translated text 136 to help the audio translator generator 138 sync the timing of translated audio with the original audio.

The video preprocessor 124 runs facial recognition and alignment of all faces to find and crop "trajectories" of faces in input video 104. This may be done in the cloud or on-device.

Then, audio translation generator 138 takes only the translated transcription 134 (which includes output language 112) as input in order to generate translated audio 140. Audio translation generator 138 may use time-stamp information to split audio generation inputs into appropriately sized segments (e.g., ~1.0 s-30.0 s) and synchronize translated audio 140 with input audio 106. Audio translation generator 138 may also split information into segments (e.g., ~1.0 s-30.0 s) in order to handle audio translation generation for long-form content (>120.0 s).

Audio generation may be accomplished through a 3rd-party TTS provider, like Google, AWS, and Apple or through a custom TTS implementation inspired by for example TacoTron2, MelloTron, FlowTron, etc. (either cloud or on-device).

The output from audio translation generator 138 is translated audio file 140 with the same length as the original audio. Translated audio file 140 may include background/ambient noise data from the original audio, translated voice data/sound with voice data/sound from the original audio removed, and the translated voice data/sound matches closely in time to the spoken elements of the original audio.

Video sync generator 144 takes translated audio 140, the pre-processed video, and input video 104 as input in order to generate the translated video 146. Video sync generator 144 may use Wav2Lip model trained on custom dataset or a model inspired by Wav2Lip, but trained on custom dataset with additional data augmentation and changes in the "blacked out" sections during training. Video sync generator 144 may include a post-processor (non "Secondary Stage") to insert generated output into the original video, which may include masking based on original facial landmarks/mouth landmarks.

Figure 10:
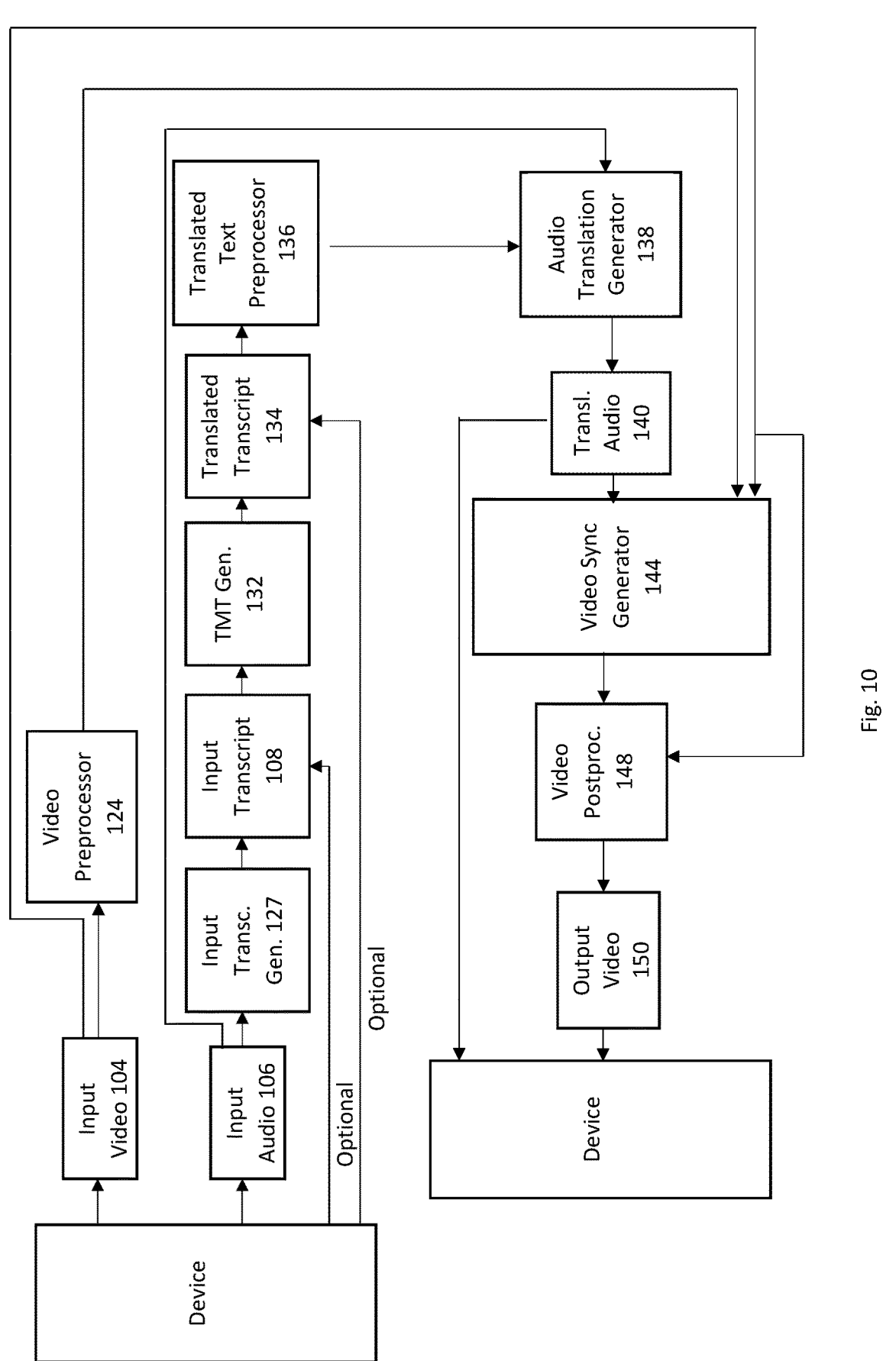
FIG. 10 is a block diagram of an implementation of an embodiment of the present invention.

Implementation 1.2 is an end-to-end translation device as illustrated in FIG. 10. This implementation further includes the secondary stage video quality generator, which improves the output. This generator may be trained on paired data from a cycle-reconstruction dataset from the custom model inspired by Wav2Lip or be based on FewShotVid2Vid network.

Figure 11:
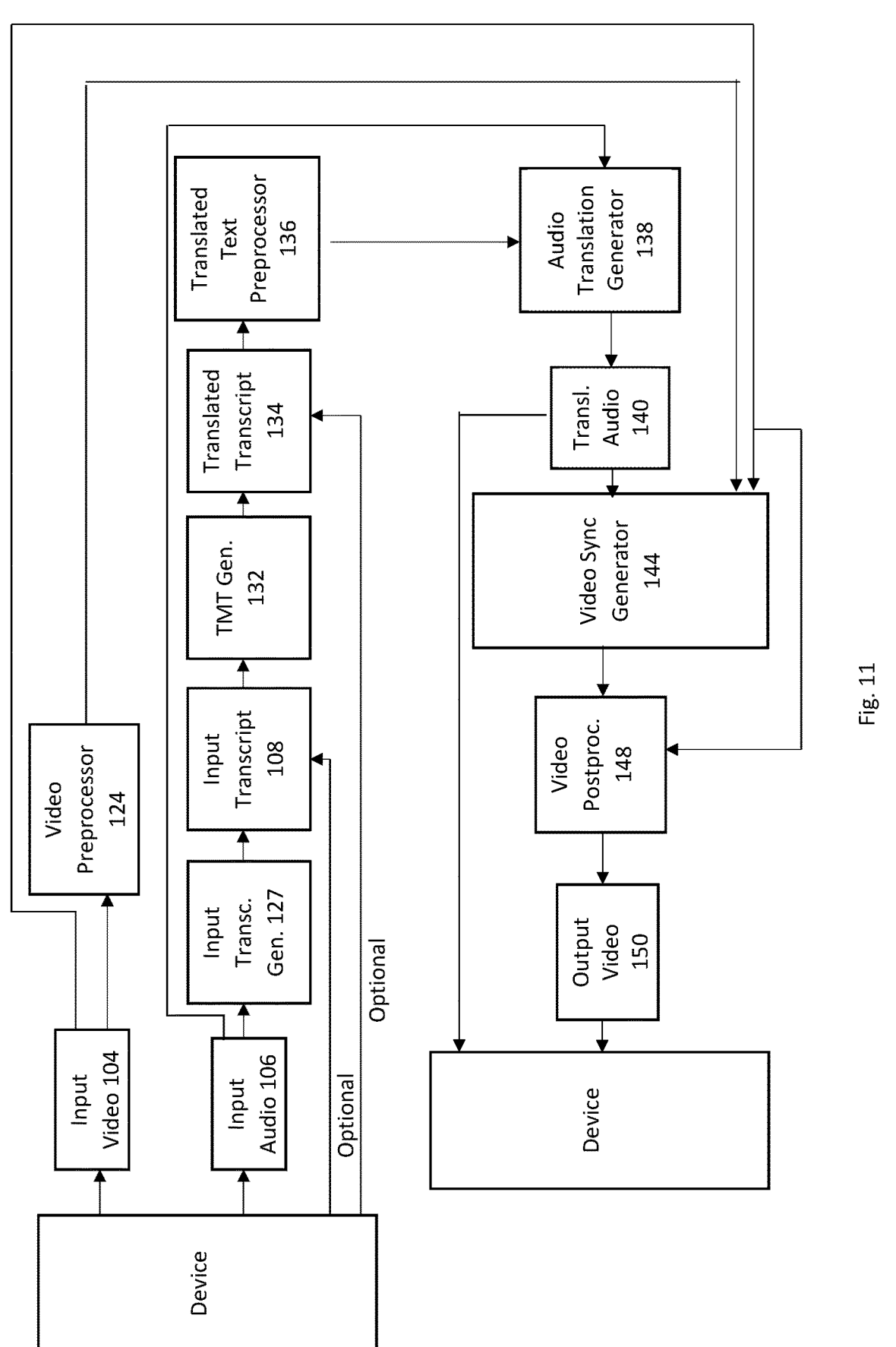
FIG. 11 is a block diagram of an implementation of an embodiment of the present invention.

Implementation 1.3 is an end-to-end translation device as illustrated in FIG. 11. This implementation further includes inputting input audio 106 into audio translation generator 138 to create audio translations that match the original speaker's voice characteristics, identity, emotions, etc. Audio translation generator 138 may be implemented in an unsupervised fashion with a custom model inspired by Adaptative Voice Conversion network trained on custom data. In addition, audio translate generator 138 may include a custom trained WaveGlow network trained on cycle-reconstruction data as a secondary stage quality enhancement post-processor. Audio translation generator 138 may apply voice characteristics, identity, emotions, etc. from input audio 106 onto the audio translation output from implementation 1.1.

Figure 12:
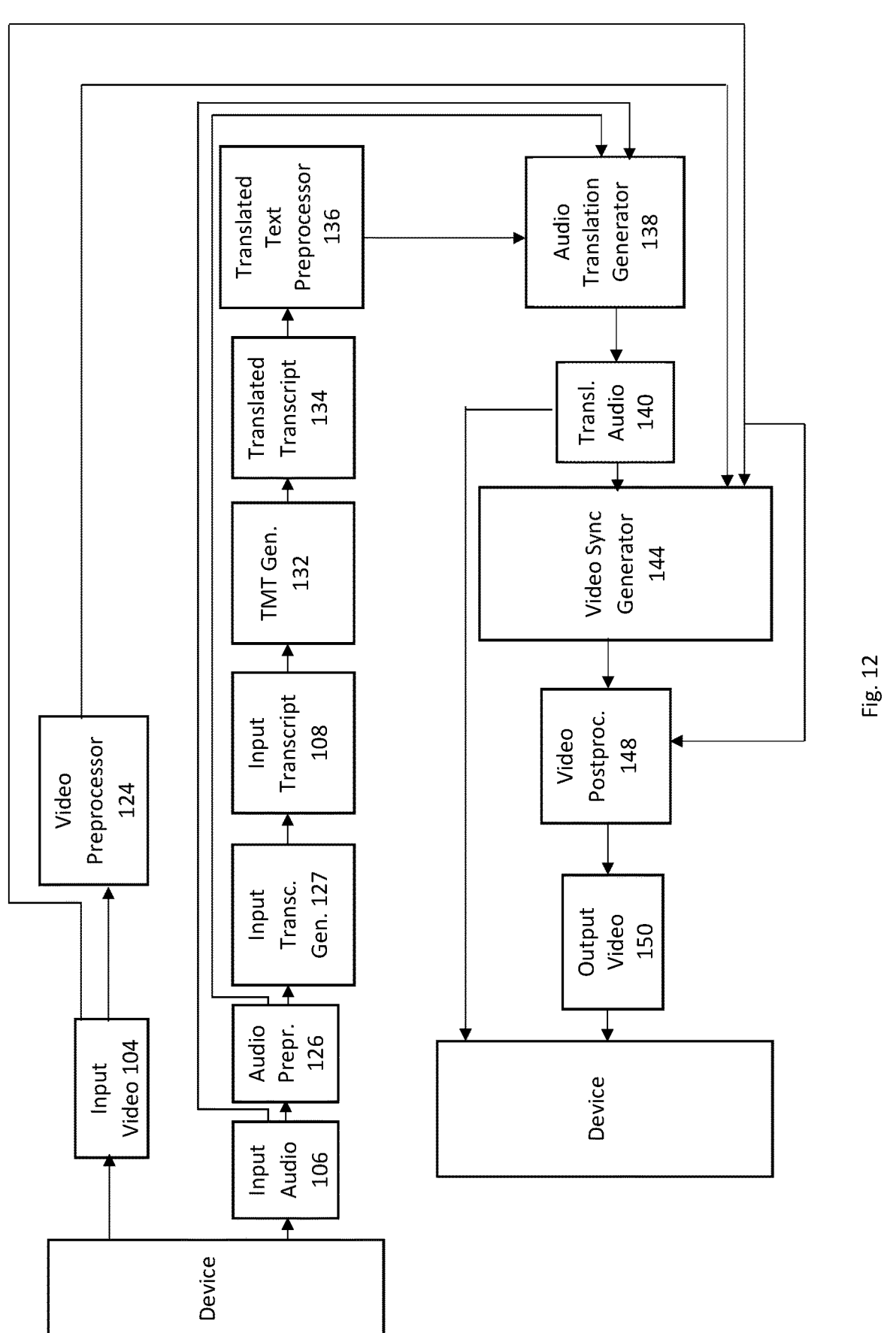
FIG. 12 is a block diagram of an implementation of an embodiment of the present invention.

Implementation 1.4 is an end-to-end translation device as illustrated in FIG. 12. Implementation 1.4 includes audio pre-processor 126, which may include background noise separation, speaker diarization, and/or semantic segmentation. The outputs from audio pre-processor 126 may be used to enhance quality and accuracy of transcription results and enhance quality and accuracy of audio translation.

Figure 13:
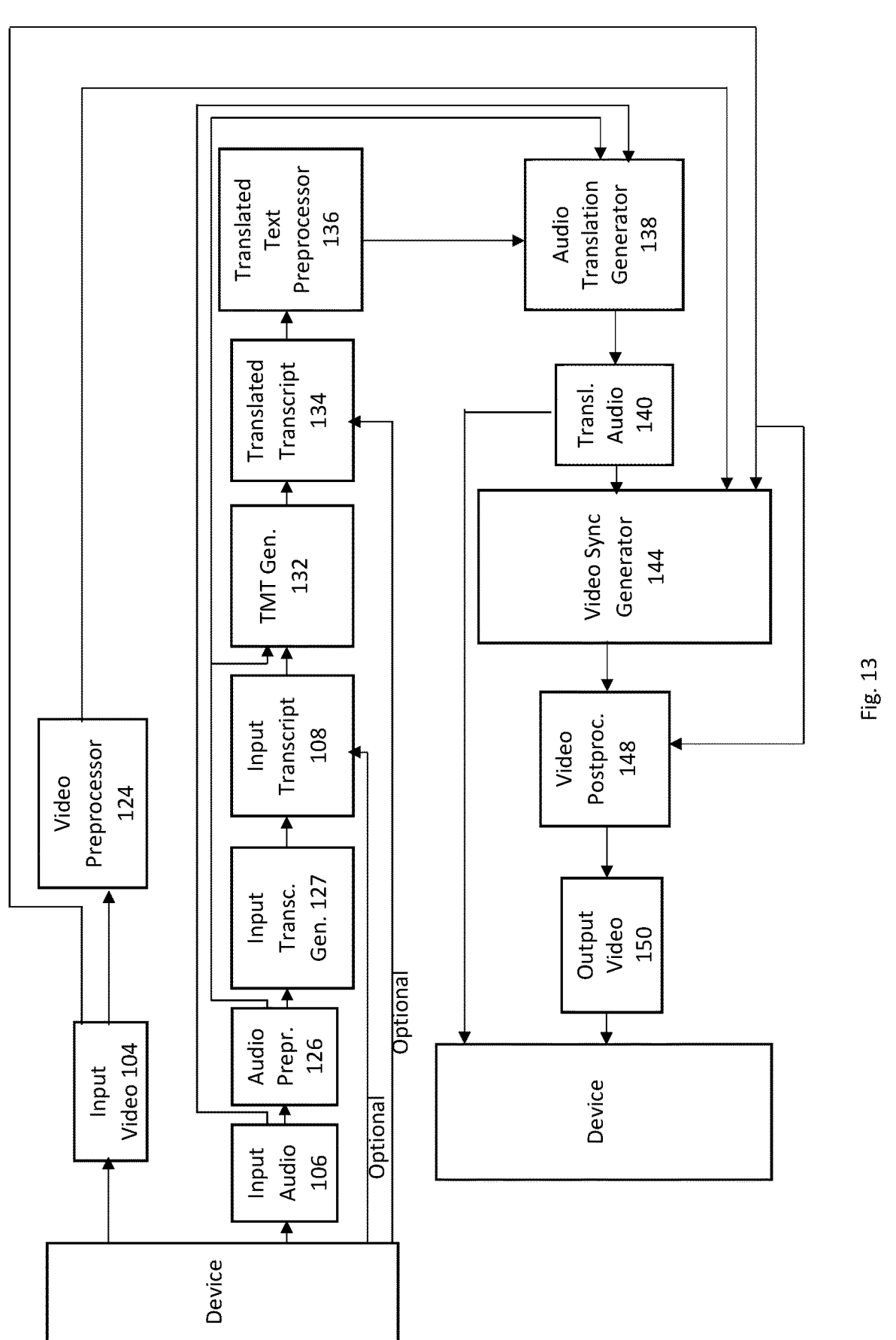
FIG. 13 is a block diagram of an implementation of an embodiment of the present invention.

Implementation 1.5 is an end-to-end translation device as illustrated in FIG. 13. Implementation 1.5 includes providing pre-processed audio input into transcription and meta translation generator 132. This approach may be used to train custom GAN networks or Transformer networks with improved quality and accuracy for transcription translation; may enable translation results to pick up on sarcasm, humor, idioms, etc. based on the original audio input; and may allow for more advanced unsupervised and semi-supervised training of transcription translation generator to improve quality and accuracy and to allow for transcription results on languages not seen often or at all during training (e.g. Few-Shot and One-Shot networks).

In some embodiments, the present invention is an augmented reality (AR) translator that provides real-time results or close to real-time results. The AR translator enables seamless communication across all languages in pre-recorded content and live audio or audio/video chats.

Hardware and Software Infrastructure Examples

The present invention may be embodied on various computing systems and/or platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system configured to generate a synthetic media with translated speech corresponding to an input media file, comprising:

at least one processor; and memory including instructions that, when executed by the at least one processor, cause the system to:

digitally acquire the input media file, wherein the input media file includes input audio in a first input language;

acquire an input transcription of the input audio, wherein the input transcription includes text corresponding to the words spoken in the input audio;

acquire input meta information of the input audio, wherein acquiring the meta information includes identifying emotion data for one or more vocal segments of the input media file and emotion data includes labels from a list of predetermined emotions;

input the input transcription and the input meta information with detected emotions for the one or more vocal segments as input data into an artificial intelligence (AI) generator;

translate, by the AI generator, the first input language into a first output language, such that a translated transcription and meta information include similar emotion in comparison to the input transcription and input meta information;

provide the translated transcription and meta information to an audio translation generator which is configured to generate translated audio; and generate the synthetic digital media having translated audio.

2. The system of claim 1, wherein the input media file is in a computer-readable format.

3. The system of claim 1, wherein the instructions included in the memory further cause the system to partition one vocal stream from another, reduce background noise, or enhance a quality of the vocal streams.

4. The system of claim 1, wherein the instructions included in the memory further cause the system to capture lip movement tracking data from the input media file.

5. The system of claim 1, wherein the instructions included in the memory further cause the system to identify pacing information for each word or phoneme in each vocal segment.

6. The system of claim 5, wherein segmenting the input audio and identifying pacing information is performed by a speaker diarization processor configured to receive the input media file.

7. The system of claim 1, wherein the text of the input transcription is formatted according to the international phonetics alphabet.

8. The system of claim 1, wherein the input transcription further includes sentiment analysis and tracking data corresponding to anatomical landmarks for the speaker for each vocal segment.

9. The system of claim 1, wherein acquiring the input transcription of the input audio includes providing the input audio to an AI generator configured to convert the input audio into text.

10. The system of claim 1, wherein acquiring input meta information includes providing the input audio and the input transcription to an AI meta information processor configured to identify meta information.

11. The system of claim 1, wherein the instructions included in the memory further cause the system to stitch the translated audio for each vocal segment back into a single audio file.

12. The system of claim 1, wherein the input media file includes input video and the instructions included in the memory further cause the system to provide translated audio and the input video to a video sync generator and generating, by the video sync generator, a synced video in which the translated audio syncs with the input video.

13. A method for generating a synthetic media with translated speech corresponding to an input media file, comprising:

acquiring the input media file, wherein the input media file includes input video and input audio in a first input language;

acquiring an input transcription, wherein the input transcription includes text corresponding to the words spoken in the input audio;

acquiring input meta information derived from the input media file for one or more vocal segments of the input audio, wherein acquiring the meta information includes identifying tone data and identifying one or more detectable emotions temporally aligned with the one or more vocal segments, selected from a list of predetermined emotions;

inputting the input meta information including the temporally aligned detected emotions for the one or more vocal segments as input data into a meta translation generator;

translating, by the meta translation generator, the input transcription and input meta information into a first output language, such that a translated transcription includes similar emotion in comparison to the input transcription and input meta information; and generating the synthetic digital media having translated audio by providing the translated input transcription and meta information to an audio translation generator.

14. The method of claim 13, further including capturing lip movement tracking data from the input video.

15. The method of claim 13, further including formatting the input transcription according to the international phonetics alphabet.

16. The method of claim 13, further including identifying pacing information for each word or phoneme in each vocal segment.

17. The method of claim 13, further including stitching the translated audio for each vocal segment back into a single audio file.

18. The method of claim 13, further including:

providing the translated audio and the input video to a video sync generator; and generating, by the video sync generator, a synced video in which the translated audio syncs with the input video to create the synthetic media.

19. A non-transitory computer readable medium for generating a synthetic media with translated speech corresponding to an input media file, comprising instructions stored thereon, that when executed on at least one processor, cause the at least one processor to:

digitally acquire the input media file, wherein the input media file includes input audio in a first input language;

acquire an input transcription, wherein the input transcription includes text corresponding to the words spoken in the input audio;

acquire input meta information corresponding to one or more vocal segments in the input audio, the acquired meta information including emotion data temporally aligned with the one or more vocal segments and selected from a list of predetermined emotions;

input the input meta information including temporally aligned and detected emotions for the one or more vocal segments and input transcription as input data into a transcription and meta translation generator;

translate, by the transcription and meta translation generator, the input transcription and input meta information into a first output language, such that a translated transcription includes similar emotion in comparison to the input transcription and input meta information;

provide the translated transcription and meta information to an audio translation generator which is configured to generate translated audio; and generate the synthetic digital media having translated audio.

* * * * *